(12) United States Patent
Schartz

(10) Patent No.: US 11,427,276 B2
(45) Date of Patent: Aug. 30, 2022

(54) LIGHT ASSEMBLY FOR MOUNTING A LIGHT ELEMENT TO A VEHICLE AND METHODS THEREOF

(71) Applicant: Brogue Motorcycles, Tuscon, AZ (US)

(72) Inventor: Michael Schartz, Tucson, AZ (US)

(73) Assignee: Brogue Motorcycles, Tucson, AZ (US)

( * ) Notice: Subject to any disclaimer, the term of this patent is extended or adjusted under 35 U.S.C. 154(b) by 0 days.

(21) Appl. No.: 17/528,983

(22) Filed: Nov. 17, 2021

(65) Prior Publication Data

US 2022/0153375 A1   May 19, 2022

Related U.S. Application Data

(60) Provisional application No. 63/114,973, filed on Nov. 17, 2020.

(51) Int. Cl.
| | |
|---|---|
| *B62J 6/027* | (2020.01) |
| *B62J 6/026* | (2020.01) |
| *F21V 19/00* | (2006.01) |

(52) U.S. Cl.
CPC .............. *B62J 6/027* (2020.02); *B62J 6/026* (2020.02); *F21V 19/001* (2013.01); *F21V 19/0055* (2013.01)

(58) Field of Classification Search
CPC ......... B62J 6/026; B62J 6/027; F21V 19/001; F21V 19/0055; B60Q 1/0483
See application file for complete search history.

(56) References Cited

U.S. PATENT DOCUMENTS

| | | | | |
|---|---|---|---|---|
| 1,063,709 | A * | 6/1913 | Marsden | F16M 13/02 248/314 |
| 4,356,536 | A * | 10/1982 | Funabashi | B62J 6/025 362/306 |
| 4,390,927 | A | 6/1983 | Von Feldt | |
| 5,195,817 | A | 3/1993 | Deccio | |
| 5,197,795 | A | 3/1993 | Mudrovich | |
| 5,758,958 | A * | 6/1998 | Chen | F21V 17/14 362/307 |
| 6,250,776 | B1 * | 6/2001 | Burkitt | F21V 31/00 362/147 |
| 6,435,691 | B1 * | 8/2002 | Macey | F21S 8/024 362/240 |
| 6,481,869 | B1 * | 11/2002 | Horandel | F21V 14/045 362/205 |
| 6,568,838 | B2 | 5/2003 | Taylor et al. | |

(Continued)

FOREIGN PATENT DOCUMENTS

TW    201532876 A    12/2014

*Primary Examiner* — Zheng Song
(74) *Attorney, Agent, or Firm* — Polsinelli PC

(57) ABSTRACT

A light assembly including a light holder is disclosed. The light holder includes a first ring configured for threaded engagement with a second ring to form a body defining an annular cavity to maintain a light element in a fixed position relative to a motorcycle or other vehicle. The light holder includes a spacer preconfigured for the light element that provides cushion and vibration protection between the body and the light element. Alignment markers defined along the body accommodate identification of one or more axial configurations of the first ring relative to the second ring for secure threaded engagement.

20 Claims, 23 Drawing Sheets

(56) References Cited

U.S. PATENT DOCUMENTS

| | | | |
|---|---|---|---|
| 6,695,463 B1* | 2/2004 | Hatfield, Jr. | F21S 41/28 |
| | | | 362/369 |
| 6,764,206 B1* | 7/2004 | Felty | B62J 6/027 |
| | | | 473/549 |
| 6,953,260 B1 | 10/2005 | Allen | |
| 7,232,252 B1 | 6/2007 | Shih | |
| 8,545,069 B2 | 10/2013 | McCaslin et al. | |
| 8,578,647 B2 | 11/2013 | Storch | |
| 8,939,619 B2 | 1/2015 | Shibata | |
| 2009/0231869 A1* | 9/2009 | Osugi | B60Q 1/0683 |
| | | | 362/475 |
| 2011/0273896 A1* | 11/2011 | Yun | B60Q 1/0047 |
| | | | 362/476 |
| 2020/0290694 A1* | 9/2020 | Yamasaki | B62J 6/026 |

* cited by examiner

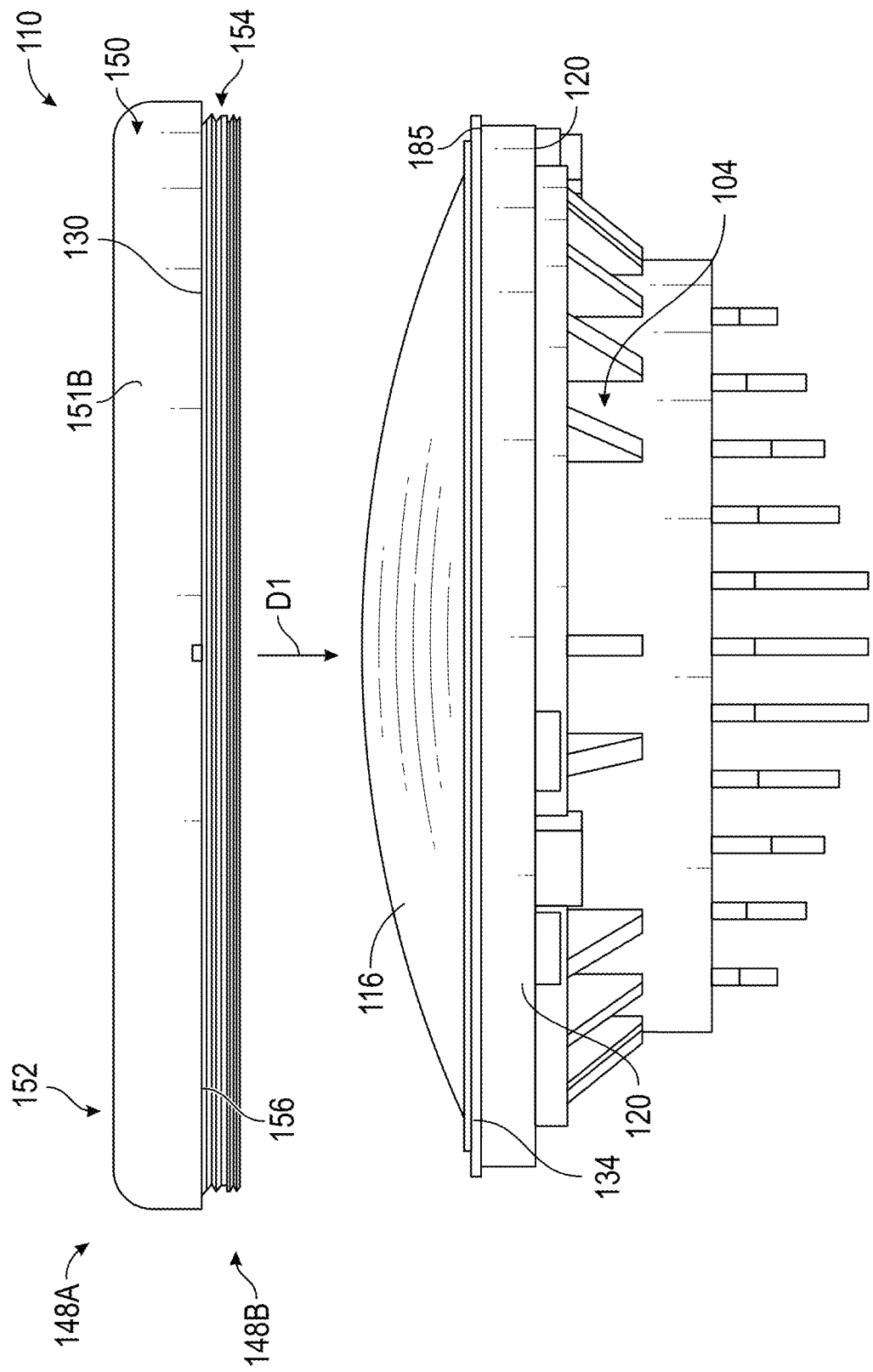

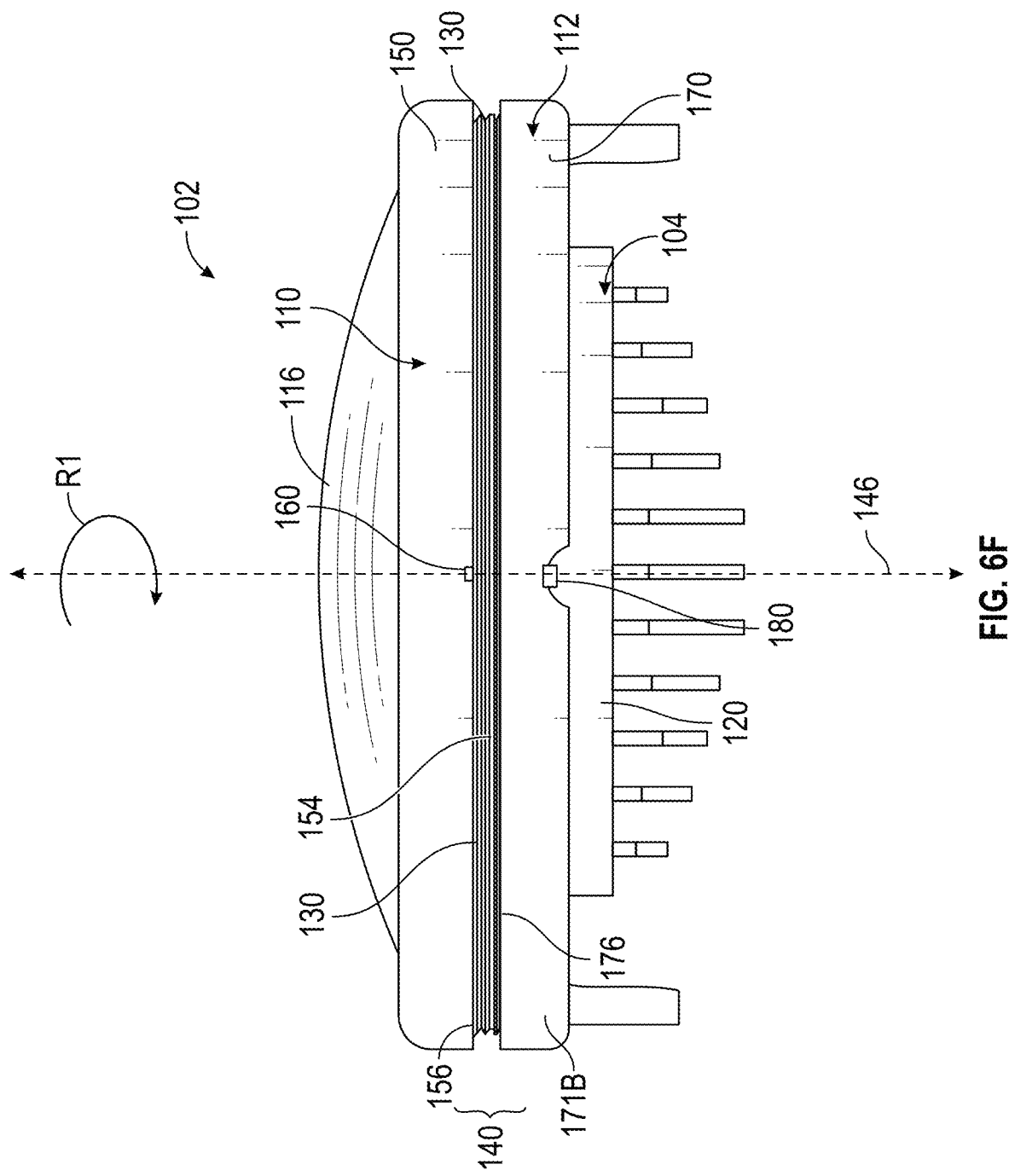

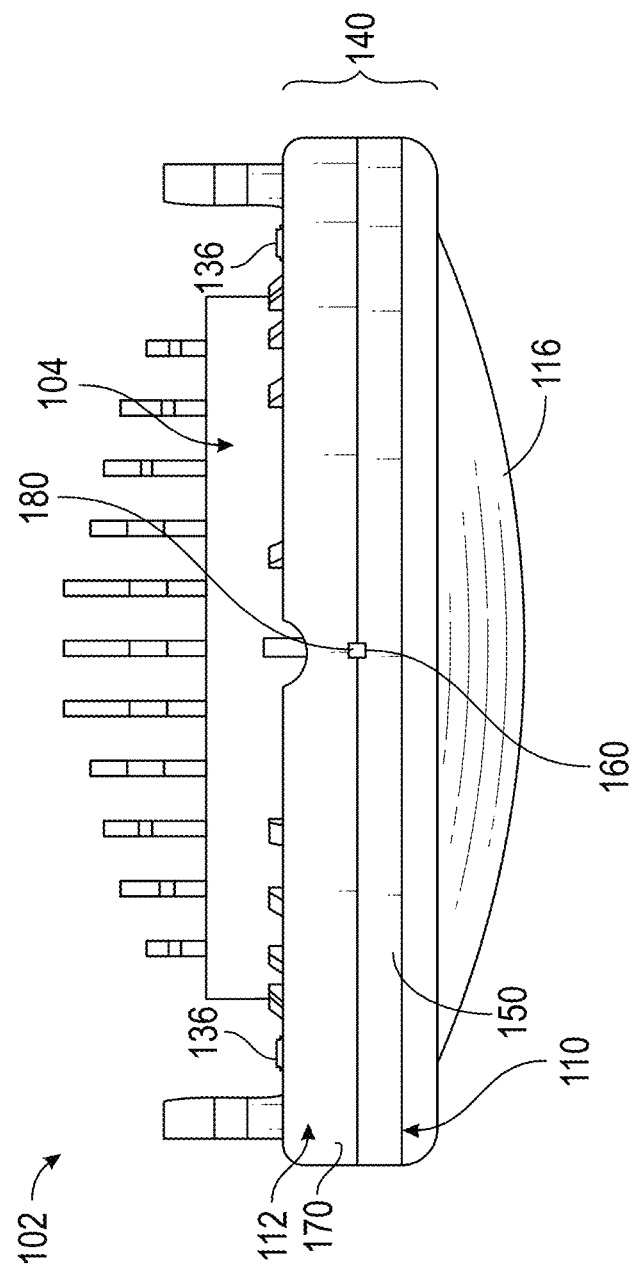

LIGHT ASSEMBLY FOR MOUNTING A LIGHT ELEMENT TO A VEHICLE AND METHODS THEREOF

CROSS REFERENCE TO RELATED APPLICATIONS

This is a non-provisional application that claims benefit to U.S. Provisional Application Ser. No. 63/114,973, filed on Nov. 17, 2020, which is herein incorporated by reference in its entirety.

FIELD

The present disclosure generally relates to the various fields associated with accessories for light elements or light sources such as light devices; and in particular, to a light assembly including a threaded light holder which may be deployed to position a light element along a motorcycle or other vehicle.

BACKGROUND

Light elements and light sources and related devices such as light emitting diodes (LEDs) are often mounted along vehicles such as motorcycles, and installation thereof must be conducted efficiently and securely. In some cases, for example, it is desirable to mount some aftermarket light element along a motorcycle, as a headlight or for other utility. However, conventional accessories for mounting such aftermarket light elements are bulky in dimensions and design, involve complicated installation procedures, and require special tools to install.

It is with these observations in mind, among others, that various aspects of the present disclosure were conceived and developed.

BRIEF DESCRIPTION OF THE DRAWINGS

FIGS. 6A-6k are side views illustrating a process of engaging the first ring with the second ring of the light holder.

Corresponding reference characters indicate corresponding elements among the view of the drawings. The headings used in the figures do not limit the scope of the claims.

DETAILED DESCRIPTION

Aspects of the present disclosure relate to a light assembly including a light holder mountable to a motorcycle or other vehicle. The light holder is configured for efficient threaded and seamless installation with minimal hardware required, and its slim profile is particularly suitable for a wide variety of motorcycle applications without compromising functionality. The light holder is universal in that it is adaptable to a variety of different light elements and is further suitable for different light dimensions. As such, the light holder accommodates installation of additional or after-market lights to a motorcycle, vehicle, and the like. When implemented to, e.g., mount a light element along a motorcycle, the light holder maintains the light element in a fixed position relative to the motorcycle and provides a secure fit along the light holder to reduce rattling or loosening of the light element from its position relative to the motorcycle and light holder.

In some embodiments, the light holder includes a first ring defining a general bezel profile, and a second ring defining a general bezel holder or bucket profile with the first ring configured for threaded engagement with the second ring. The first and second rings may be engaged as described about a light element in order to securely mount the light element to, e.g., a motorcycle frame. In some embodiments, the light holder includes a spacer which may take the form of a gasket or other such component positioned between the light element and the light holder to provide cushion and vibration protection. In some embodiments, the first and second rings of the light holder include alignment markers that facilitate the threaded engagement, and inform as to a predetermined axial arrangement of the first ring relative to the second ring for passing one or more fasteners (e.g., jacking screws) through the first and second ring for a more permanent/assembled configuration, as further described herein.

Figure 1A:
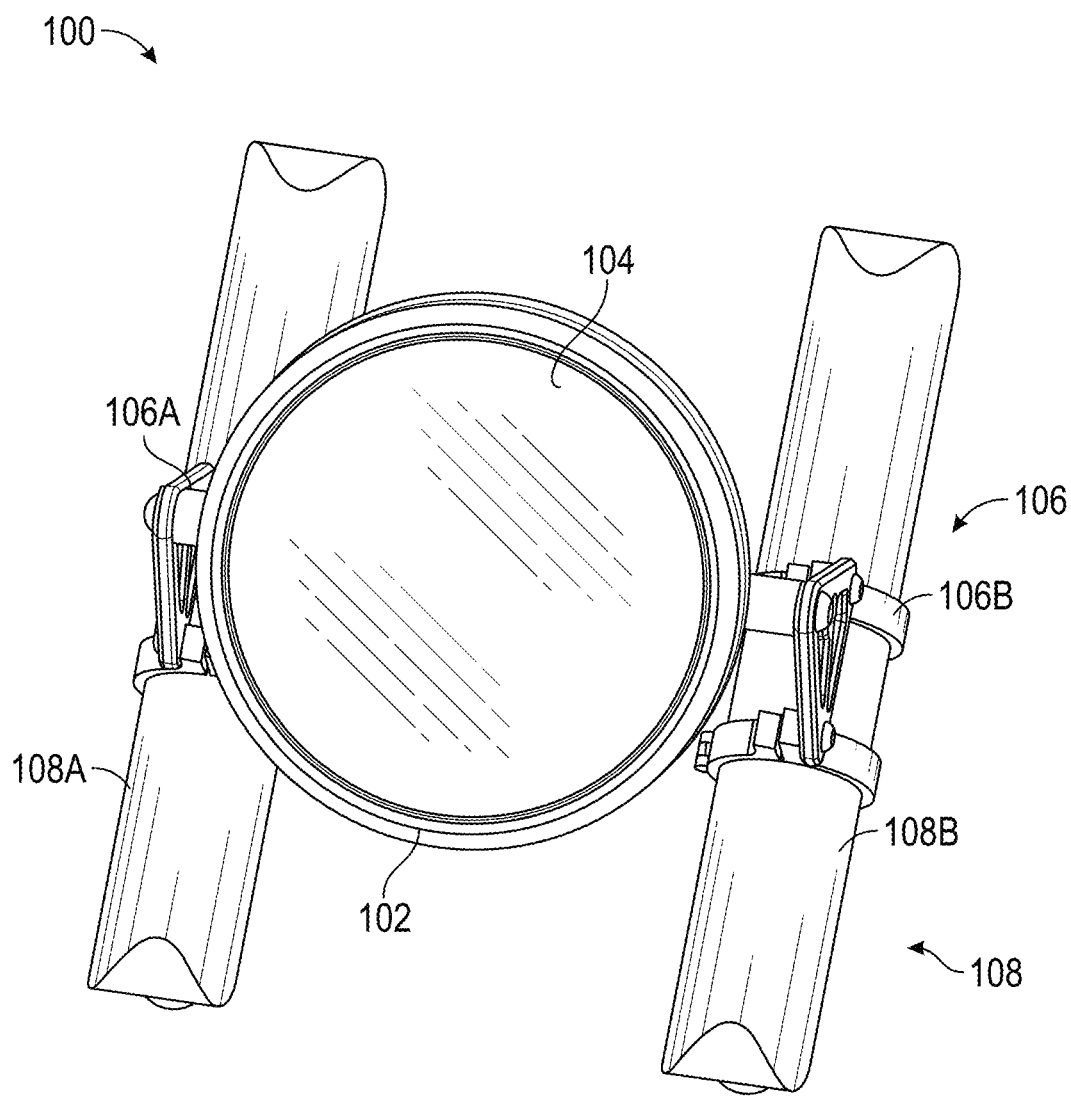
FIG. 1A is a perspective view of a light assembly including a light holder as described herein mounted to a motorcycle frame.
Figure 1B:
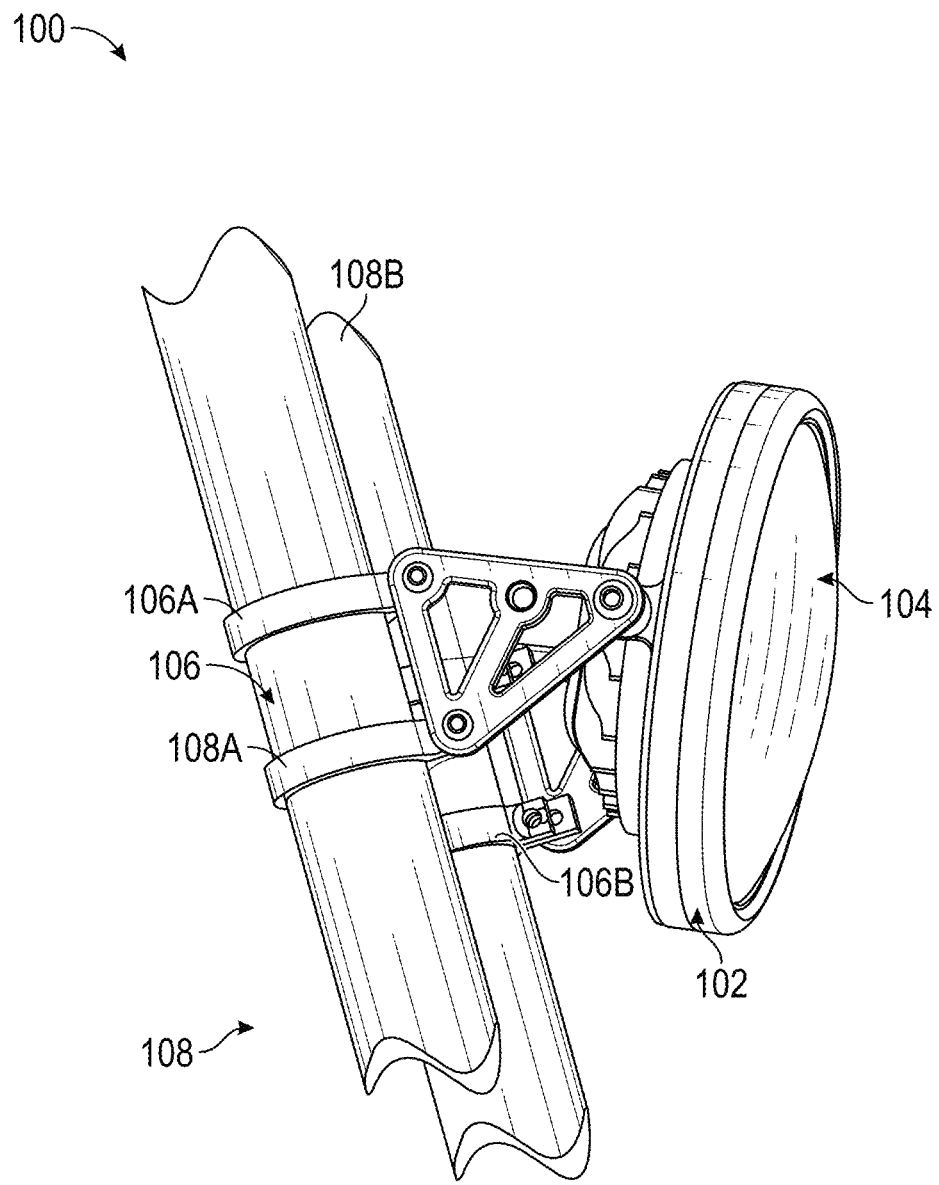
FIG. 1B is a side view of the light assembly of FIG. 1A.

Referring to FIGS. 1A-1B, one embodiment of a light assembly 100 is shown including a light holder 102 for maintaining a light element 104 (including any light device such as an LED) within a fixed position relative to a motorcycle or other vehicle (not shown). As indicated, the light element 104 is partially enclosed by the light holder 102, i.e., the light holder 102 extends around and at least partially encloses the light element 104 such that the light element 104 is generally fixed or secured to the light holder 102. As further indicated, the light holder 102 may be mounted to a plurality of braces 106, which may be in turn mounted to respective frames 108 of a motorcycle such that the braces 106 interconnect the light holder 102 and light element 104 to the frames 108. Specifically in the example shown, the light holder 102 is mounted to a brace 106A, which is in turn mounted to a frame 108A, and the light holder 102 is further mounted to a brace 106B, which is in turn mounted to a frame 108B in the manner shown. The subject mounting arrangement is merely exemplary, and it should be appreciated that the light holder 102 may be mounted to the frames 108 in other similar configurations, the light holder 102 (and light element 104) may be mounted to a single frame, or mounted to any component of a motorcycle or other vehicle, without departing from the novel features associated with the engagement of the components of the light holder 102 about the light element 104 and advantages thereof, as further described herein.

Figure 2:
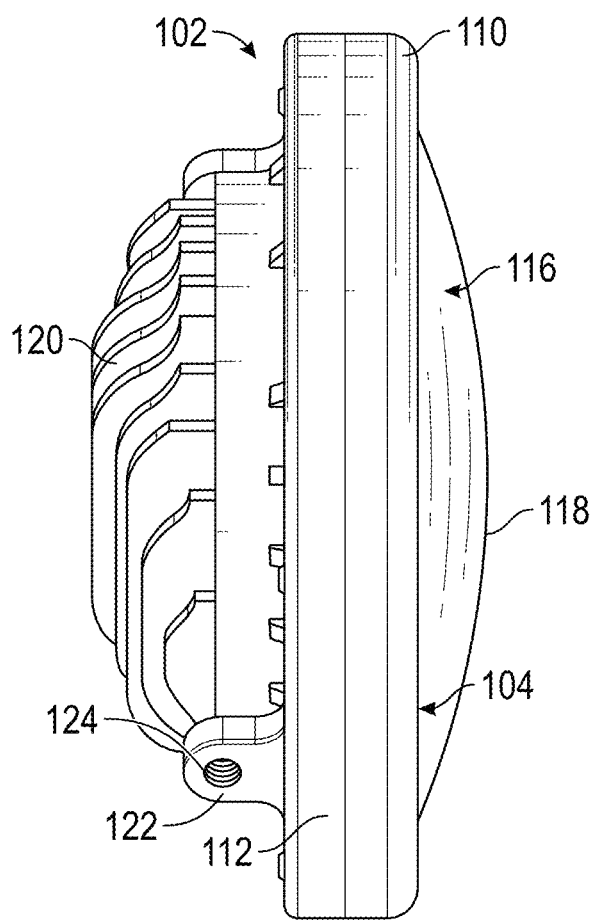
FIG. 2 is a side view of the light holder of FIG. 1A.
Figure 3A:
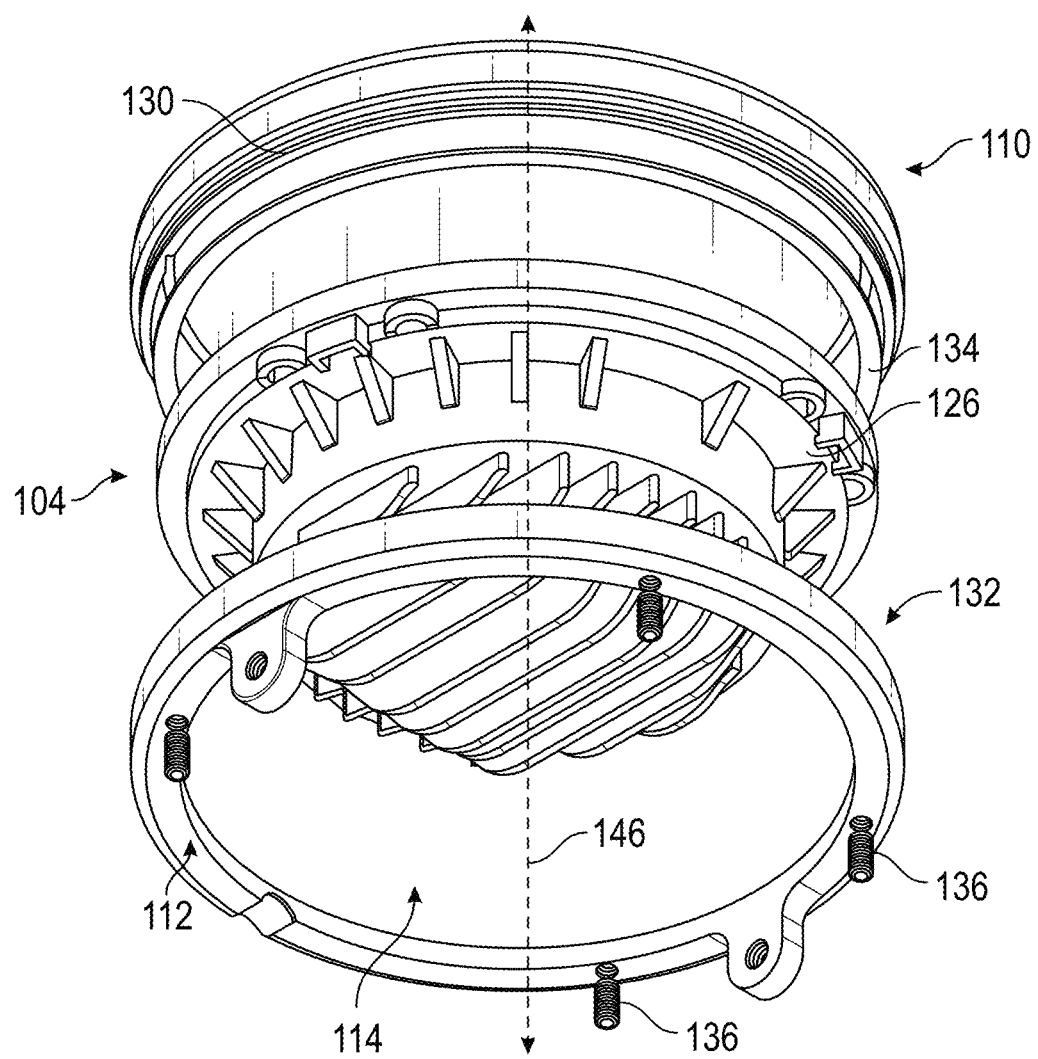
FIG. 3A is an exploded perspective view of the light holder of FIG. 2 indicating general arrangement relative to a light element.
Figure 3B:
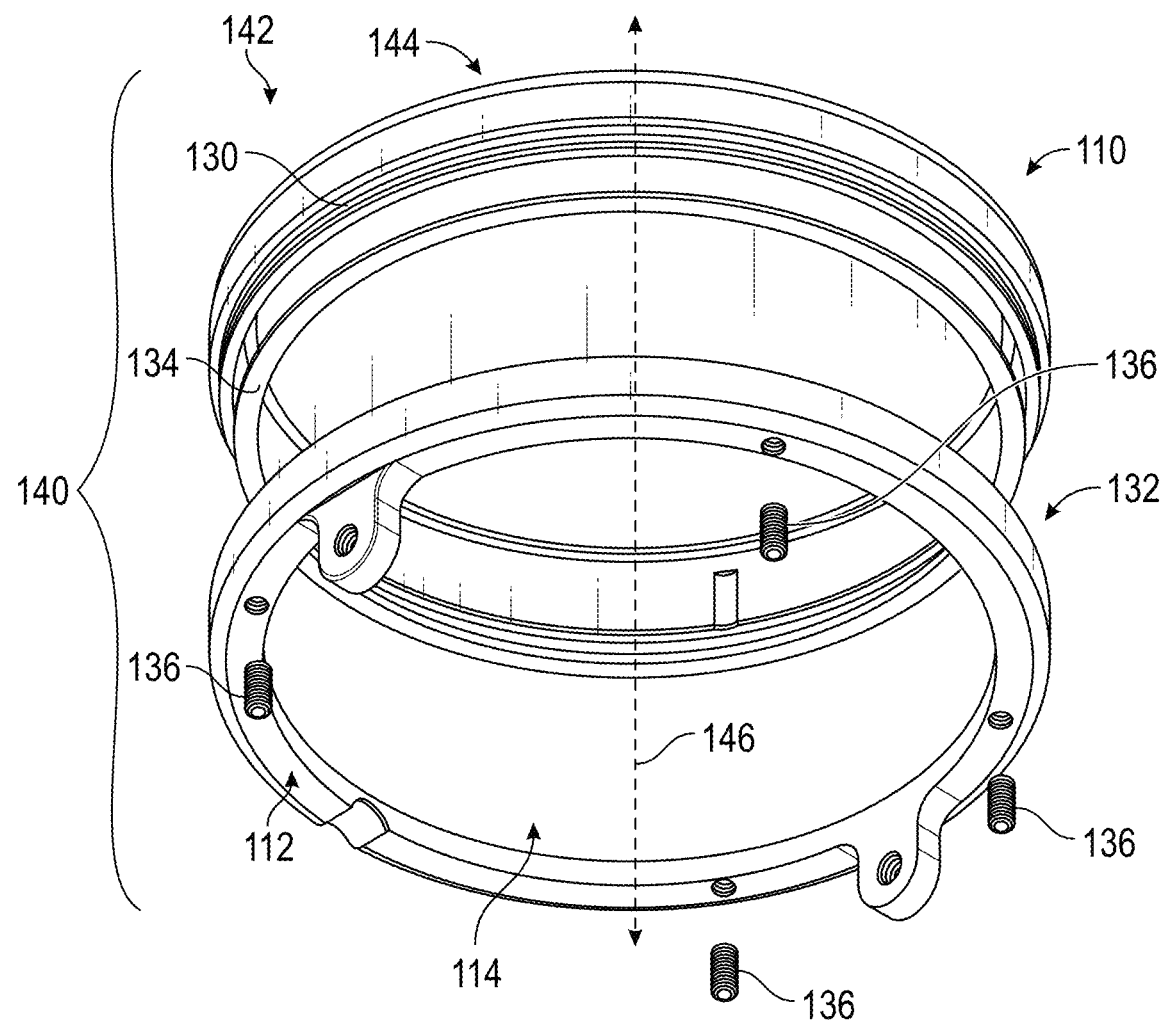
FIG. 3B is an exploded perspective view of the light holder of FIG. 2 without a light element.

Referring to FIG. 2 and FIGS. 3A-3B, one embodiment of the light holder 102 is shown that is configured for installation to the frames 108 or other receiving structure. In general, the light holder 102 includes a first ring 110 in threaded engagement with a second ring 112 as further described herein, collectively forming a body 140 (FIG. 3B). When engaged as shown, the first ring 110 and the second ring 112 collectively form a channel 114 passing through the body 140 (more clearly visible in FIGS. 3A-3B), and the light holder 102 is positioned about the light element 104 such that the light element 104 extends at least partially through the channel 114. More specifically, the light element 104 comprises a face portion 116 including a lens 118 enclosing any number of light devices such as light emitting diodes (LEDs) (not shown), and the light element 104 further includes a housing 120 in communication with the face portion 116 that encloses any number of electrical devices and connections for powering and operating the light element 104, as would be understood by one of ordinary skill in the art. In some embodiments, the housing 120 of the light element 104 defines a peripheral flange 126 that is captured and secured within the light holder 102 as will be described in greater detail below.

When the first ring 110 and the second ring 112 of the light holder 102 are fully secured to one another via threaded engagement and extend about the light element 104 as described herein, the face portion 116 of the light element 104 at least partially protrudes or extends from the first ring 110, and the housing 120 of the light element 104 at least partially protrudes or extends from the second ring 112 as shown. In addition, one or more mounting tabs 122 defining apertures 124 may be pre-formed along the second ring 112 (or first ring 110) to facilitate mounting of the light holder 102 to the braces 106 of FIG. 1A or other structure.

As further indicated in FIGS. 3A-3B, the first ring 110 defines a plurality of (external) threads 130 and the second ring 112 defines a plurality of (internal) threads 132 (more clearly shown in FIG. 5A) configured for threaded engagement with the plurality of threads 130. In addition, one or more of a spacer 134 (which may include a gasket or other such component), having a ring-shape configuration, may be positioned between the light element 104 and the first ring 110 as indicated. The spacer 134 provides vibration and cushion protection as further described herein, and accommodates fixed, secure alignment of the light element 104 relative to the light holder 102. In addition, a plurality of fasteners 136, such as jacking screws, bolts, or the like, may be engaged to portions of the light holder 102 to form a locked configuration of the light holder 102, as further described herein.

As shown in FIG. 3B, the first ring 110 and the second ring 112 collectively form a body 140 also naturally having a ring-shape configuration, and defining an exterior side 142, an interior side 144, and a center axis 146. The channel 114, previously referenced, extends longitudinally through the body 140 generally along the center axis 146. During formation of the body 140, the plurality of threads 130 of the first ring 110 are mated with the plurality of threads 132 of the second ring 112, which permits the first ring 110 and the second ring 112 to effectively be screwed together by twisting the aforementioned components relative to one another about the center axis 146, as further described herein.

Figure 4A:
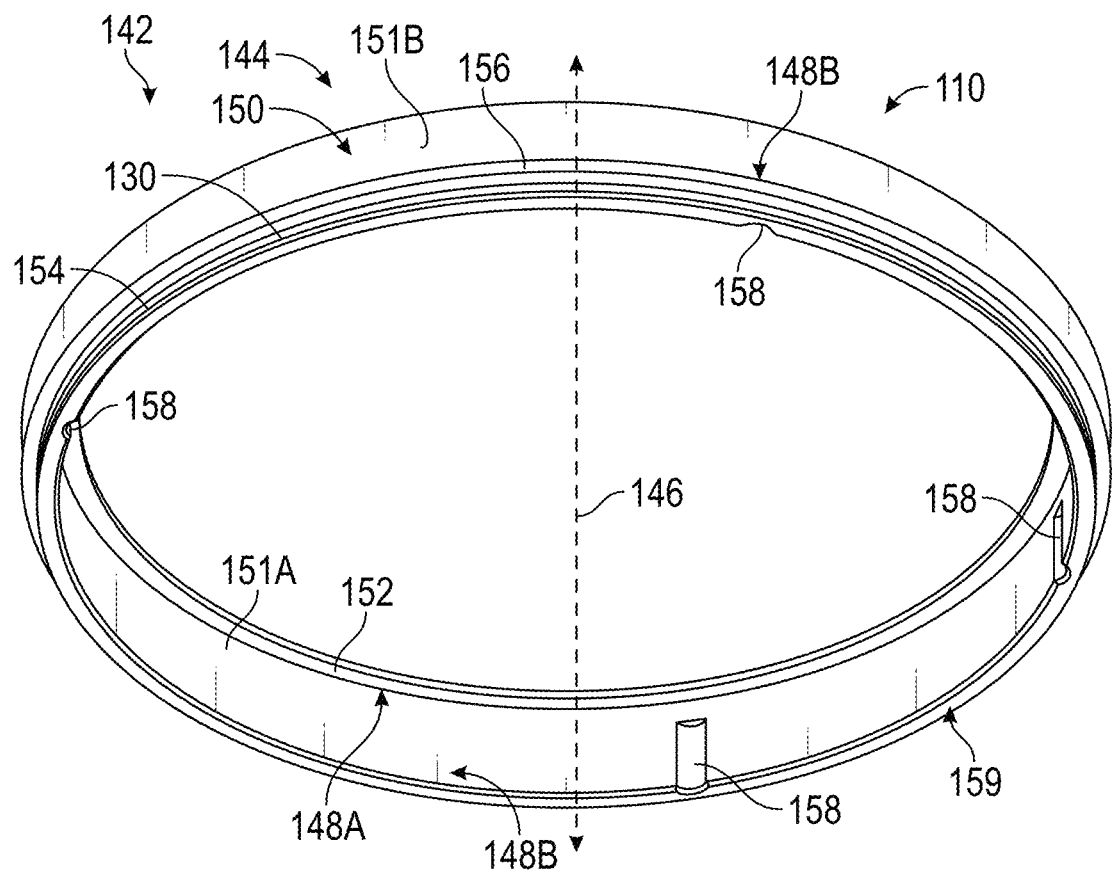
FIG. 4A is an isometric view of a first (front) ring of the light holder described herein.

Referring to FIG. 4A, further detail of the first ring 110 of the body 140 of the light holder 102 is shown. As indicated, the first ring 110 defines a distal peripheral portion 148A and a opposite proximal peripheral portion 148B, collectively defining a sidewall 150. The sidewall 150 extends circumferentially about the center axis 146 and defines an interior surface 151A and an exterior surface 151B. The first ring 110 further includes a ridge 152 defined along the interior surface 151A and extending from the proximal peripheral portion 148A of the first sidewall 150. The ridge 152 extends annularly about the center axis 146 along the interior side 144 of the housing (where the spacer 134 rests) and along the interior surface 151A, and is in general orthogonal relation relative to the sidewall 150. In addition, the first ring 110 includes a recessed portion 154 in communication with the sidewall 150. The recessed portion 154 extends annularly about the center axis 146 along the proximal peripheral portion 148B and is oriented towards the exterior side 142 of the body 140. Further, the first ring 110 includes a mating end 156 defined along the sidewall 150 abutting the recessed portion 154 as indicated. The plurality of threads 130 is defined circumferentially along the recessed portion 154 and is oriented towards the exterior side 142, and the mating end 156 and the recessed portion 154 including the plurality of threads 130 are adapted for removable connection with the second ring 112, as further described herein. In some embodiments, the first ring 110 includes a plurality of (e.g., semi-cylindrical) indentations 158 formed about the first ring 110 of the body 140 along the interior surface 151A and in communication with a peripheral edge 159 of the first ring 110 defined along the proximal peripheral portion 148B. The indentations 158 permit insertion of the plurality of fasteners 136 through various predetermined of the body 140 as further described herein.

Figure 4B:
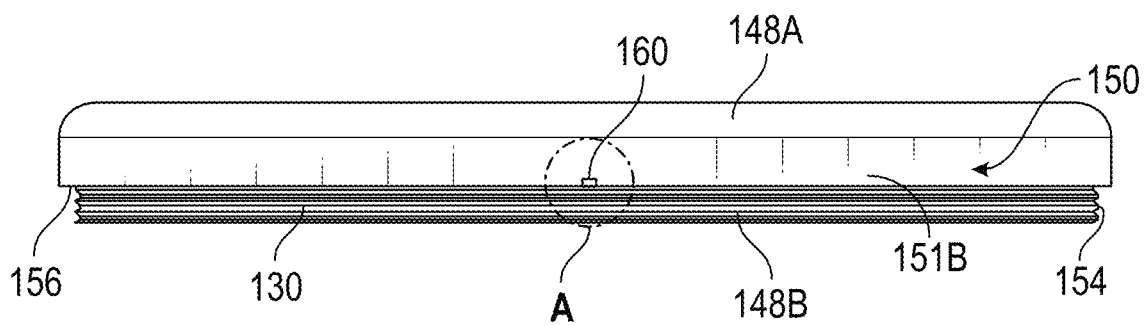
FIG. 4B is a side view of the first ring of FIG. 4A.
Figure 4C:
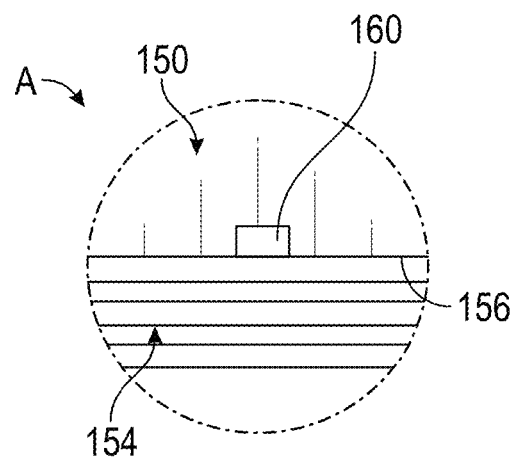
FIG. 4C is an enlarged side view of the region A of the first ring indicated in FIG. 4B.

In addition, referring to FIG. 4B including the enhanced view of region A shown in FIG. 4C, the first ring 110 includes at least one of an alignment marker 160. The alignment marker 160 is defined at a predetermined position along the exterior surface 151B of the first ring 110 generally at the intersection between the sidewall 150 and the mating end 156 (and proximate to the recessed portion 154). During engagement of the first ring 110 with the second ring 112, the alignment marker 160 is aligned with a corresponding alignment marker (180 of FIG. 5B and FIG. 5C) of the second ring 112 to facilitate orientation for the threaded connection, and also to inform as to a final axial configuration suitable for engagement of the plurality of fasteners 136 through the body 140, as further described herein.

Figure 5A:
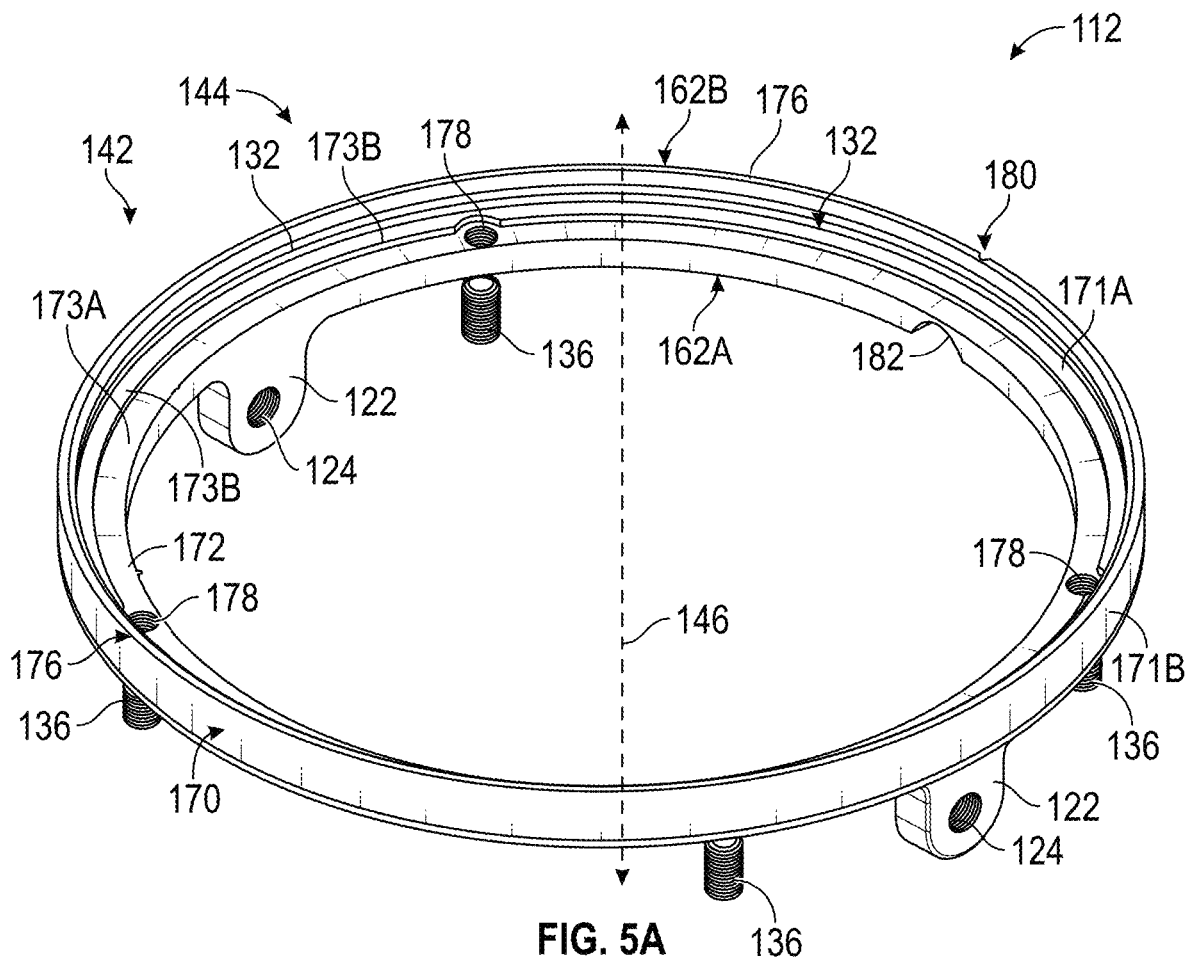
FIG. 5A is an isometric view of a second (back) ring of the light holder described herein.

Referring to FIG. 5A, further detail of the second ring 112 of the body 140 is shown. The second ring 112 defines a proximal peripheral portion 162A and an opposite distal peripheral portion 162B and includes a sidewall 170 defined collectively by the proximal peripheral portion 162A and distal peripheral portion 162B. As indicated, the sidewall 170 extends circumferentially about the center axis 146 and defines an interior surface 171A and an exterior surface 171B. The second ring 112 further includes a shelf 172 extending from the interior surface 171A of the sidewall 170 along the proximal peripheral portion 162A; the being shelf 172 in orthogonal relation relative to the sidewall 170 and extending annularly about the center axis 146. The shelf 172 receives and holds the peripheral flange 126 of the light element 104 as further described herein. In some embodiments, the shelf 172 defines a base portion 173A and a stepped portion 173B, with the stepped portion 173B providing a 90 degree step edge over the base portion 173A. This structure can accommodate a more conforming fit with the light element 104 as further described herein.

In addition, the second ring 112 further includes a mating end 176 which essentially comprises a terminal end of the distal peripheral portion 162B of the sidewall 170 as indicated. The mating end 176 of the second ring 112 is oriented towards and aligned with the mating end 156 of the first ring 110 during engagement of the first ring 110 with the second ring 112 as further described herein. As further shown, the plurality of threads 132 previously referenced is defined along the interior surface 171A of the sidewall 170 proximate to the distal peripheral portion 162B, such that the plurality of threads 132 is defined between the mating end 176 and the shelf 172. Each of the plurality of threads 132 extends circumferentially along the second ring 112, and the mating end 176 and the plurality of threads 132 are adapted for removable connection with the first ring 110, as further described herein.

In some embodiments, the first ring 110 includes a plurality of openings 178 formed about the shelf 172 of the second ring 112 as shown. The openings 178 permit insertion of the plurality of fasteners 136 through various predetermined portions of the body 140 as further described herein. When engaged with the first ring 110, the plurality of indentations 158 (FIG. 4A) align with the plurality of openings 178 to accommodate insertion of the plurality of fasteners 136. In particular, each indentation 158 and opening 178 allows receipt of a respective fastener 136 of the plurality of fasteners 136 to engage the peripheral flange 126 of the light element 104 between the first ring 110 and the second ring 112, as further described herein.

Figure 5B:
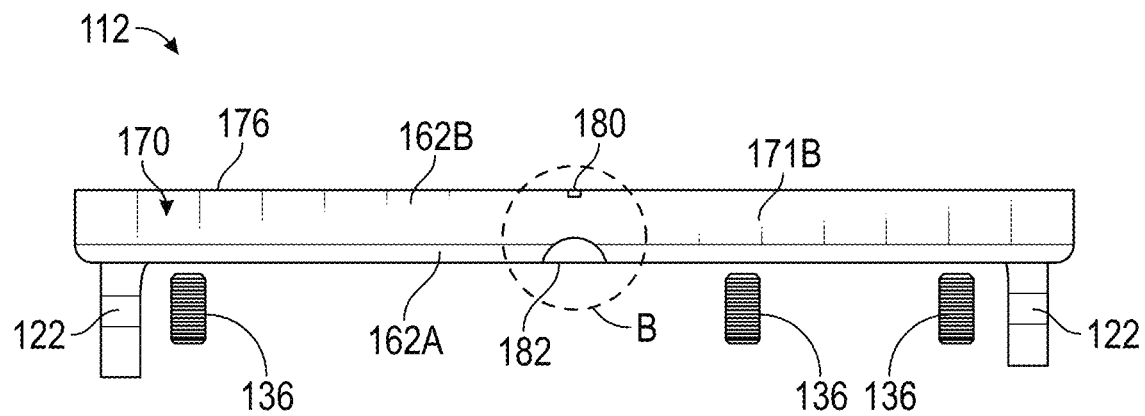
FIG. 5B is a side view of the second ring of FIG. 5A.
Figure 5C:
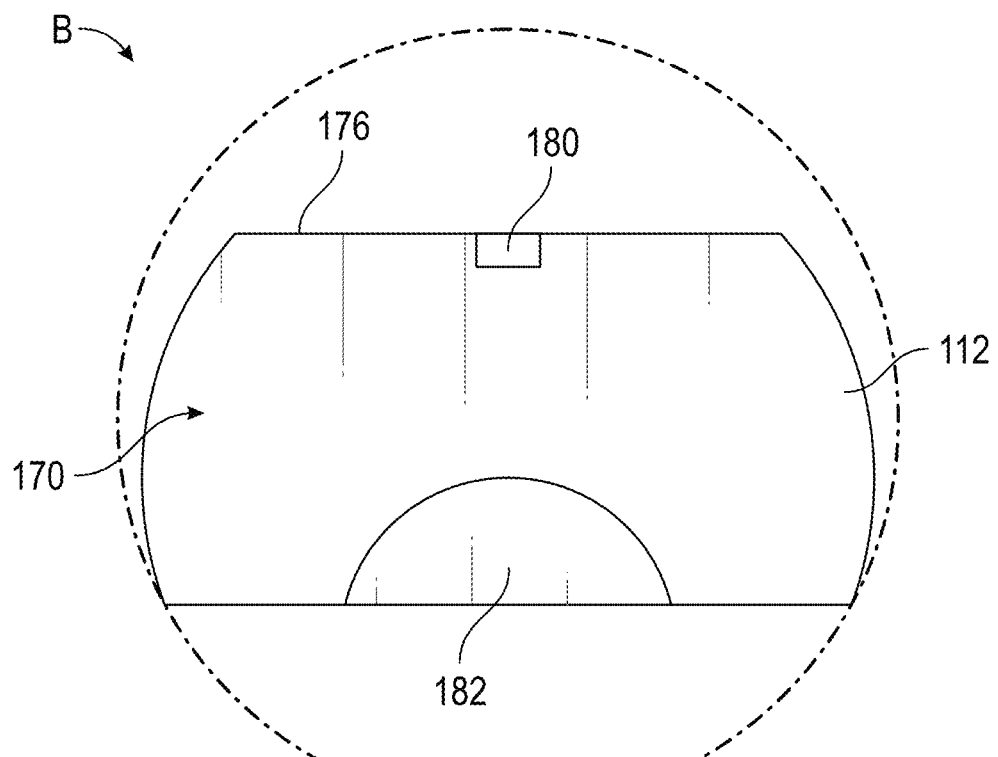
FIG. 5C is an enlarged side view of the region B of the second ring indicated in FIG. 5B.

In addition, referring to FIG. 5A, and region B of FIGS. 5B-5C, the second ring 112 includes at least one of an alignment marker 180. The alignment marker 180 is defined at a predetermined position along the distal peripheral portion 162B of the sidewall 170 and generally abuts the mating end 176. During engagement of the first ring 110 with the second ring 112, the alignment marker 180 of the second ring 112 is aligned with the corresponding alignment marker 160 of the first ring 110 to facilitate orientation for the threaded connection, and also to inform as to a final/locked axial configuration suitable for engagement of the plurality of fasteners 136 through the body 140, as further described herein. As further indicated, the second ring 112 may include a groove 182 formed along the proximal peripheral portion 162A of the sidewall 170 opposite the alignment marker 180. In general, the groove 182 provides space for structure of the light element 104 to rest against the body 140 of the light holder 102. The second ring 112 may be formed with any number of such grooves or structural modifications to accommodate different light configurations, various light structures, and dimensions.

Figure 6A:
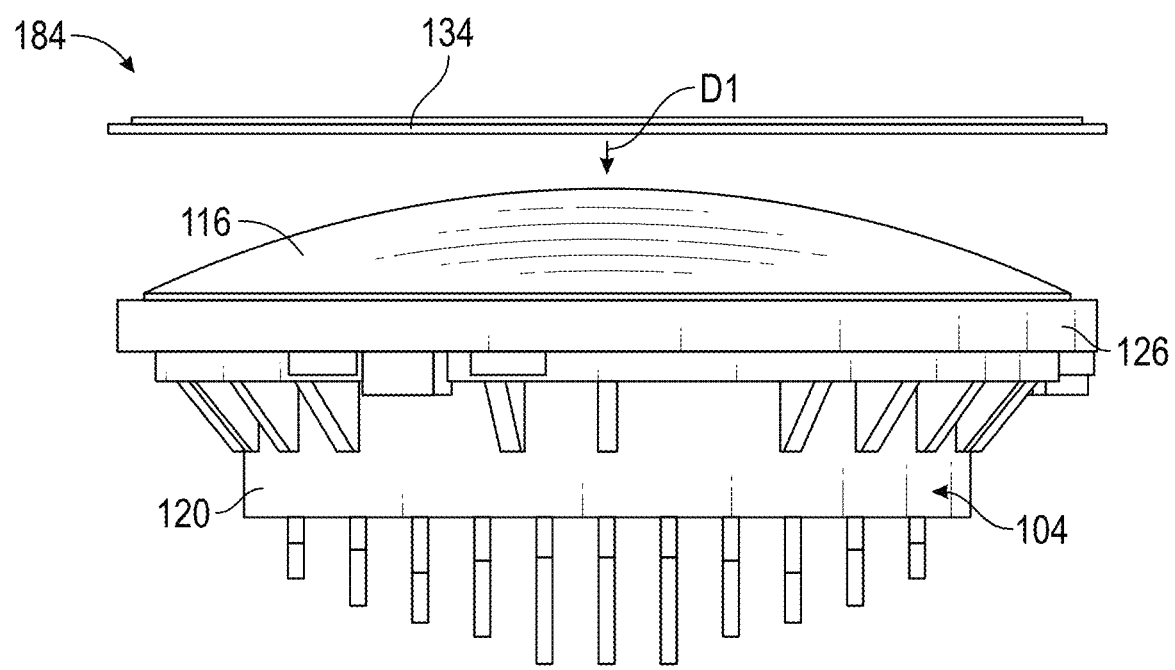
Figure 6B:
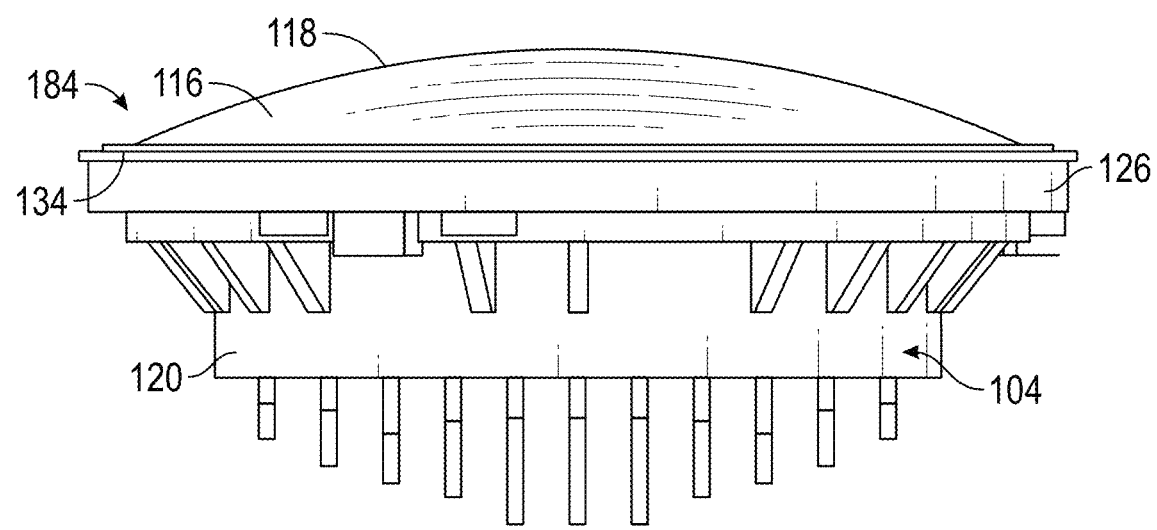

Referring to FIGS. 6A-6K, a process for engaging the first ring 110 with the second ring 112 and securing the light element 104 shall now be described to illustrate the novel threaded engagement features of the light holder 102. In FIGS. 6A-6B, the light element 104 is oriented with the spacer 134 as shown such that the spacer 134 is positioned over the face portion 116 of the light element 104. The spacer 134 is then brought down in the direction D1 to rest along the housing 120 of the light element 104 around the face portion 116, such that the lens 118 of the light element 104 at least partially extends through an opening 184 defined by the spacer 134.

Figure 6D:
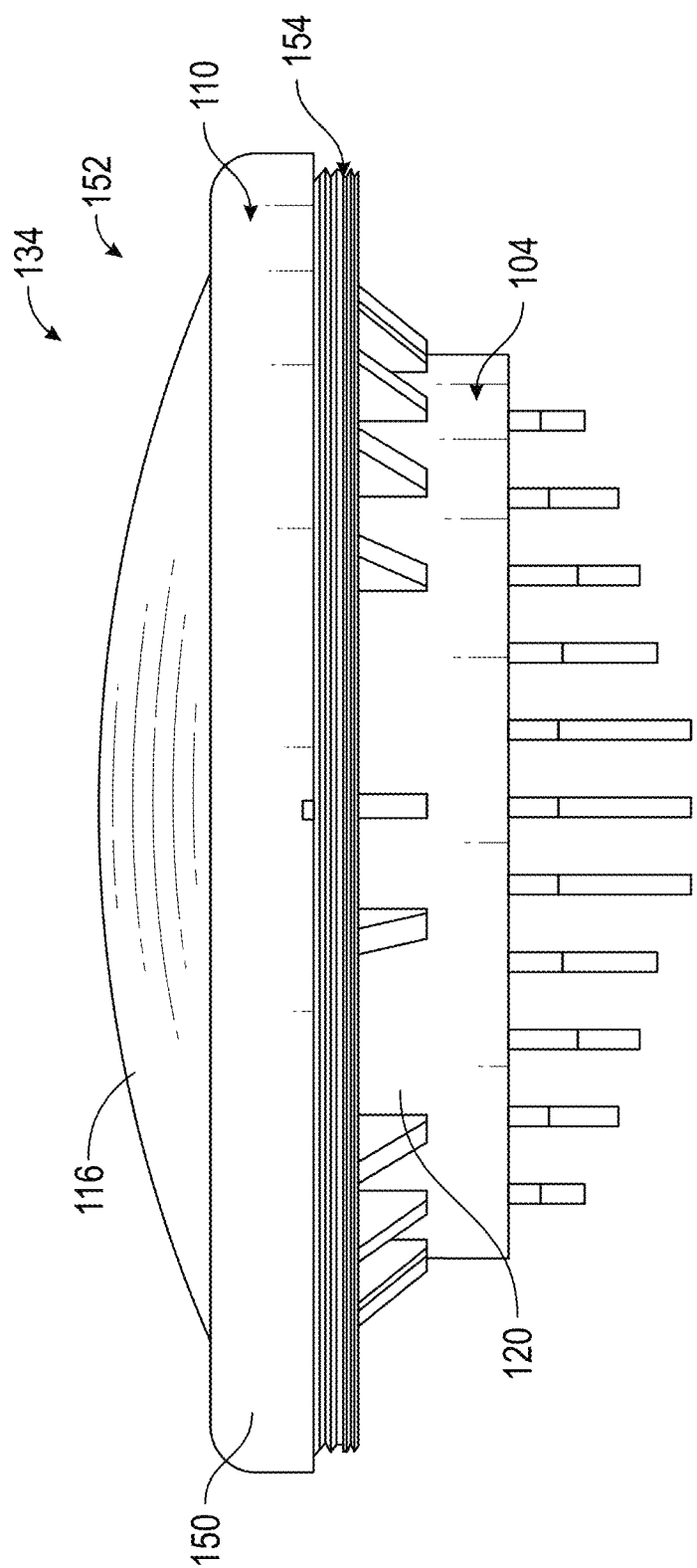

Referring to FIGS. 6C-6D, the first ring 110 may then be positioned over the light element 104 and the spacer 134 such that the mating end 156 and the recessed portion 154 of the first ring 110 is oriented towards the face portion 116 of the light element 104. The first ring 110 may then be brought down in the direction (D1) shown to rest over the housing 120 of the light element 104 such that the spacer 134 is disposed between the housing 120 of the light element 104 and rests along the ridge 152 of the first ring 110 (see FIG. 10B). In FIG. 6D, the sidewall 150 of the first ring 110 extends around the spacer 134 and at least partially around the face portion 116 of the light element 104, such that the first ring 110 at least extends around a portion of the light element 104. In addition, the ridge 152 rests along a distal surface 185 of the peripheral flange 126 (FIG. 6C) of the housing 120 and restricts movement of the first ring 110 beyond the position shown in FIG. 6D.

Figure 6E:
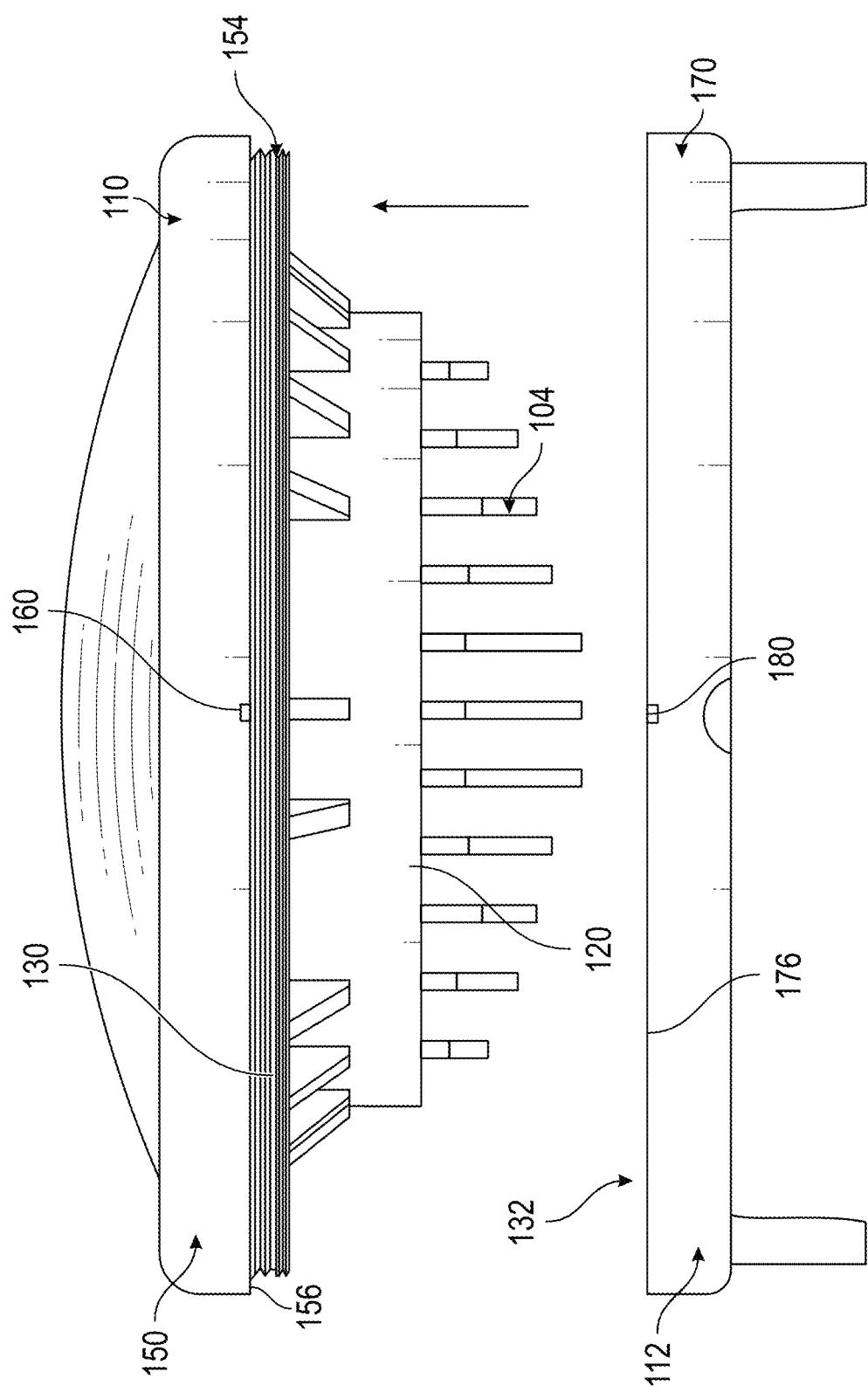

Referring to FIGS. 6E-6F, the first ring 110, resting along the peripheral flange 126 of the housing 120 of the light element 104 as described, is positioned proximate to the second ring 112 in the manner shown. Specifically, the mating end 176 of the second ring 112 is oriented towards the mating end 156 and the recessed portion 154 of the first ring 110 as shown in FIG. 6E. To properly align the subject components, the alignment marker 160 of the first ring 110 is vertically and coaxially aligned with the alignment marker 180 of the second ring 112 as shown. Aligning the first ring 110 vertically over the second ring 112 using the alignment marker 160 and the alignment marker 180 as described coaxially aligns the plurality of threads 130 with the plurality of threads 132 such that when brought together as indicated, a threaded engagement connection can be initiated between the plurality of threads 130 of the first ring 110, and the plurality of threads 132 of the second ring 112. It should be noted, to facilitate engagement, that the orientation shown in the following figures may be flipped upside down or rotated such that the second ring 112 is positioned over the first ring 110.

Referring to FIG. 6F, once the threaded engagement is initiated such that the plurality of threads 130 of the first ring 110 are joined with the plurality of threads 132 of the second ring 112, the second ring 112 may be rotated relative to the first ring 110 (and the light element 104) in the clockwise rotational direction shown (R1) about the center axis 146. (Alternatively, the first ring 110 may be rotated relative to the second ring 112 in a counter-clockwise rotational direction—reverse threads). In this manner, the first ring 110 and the second ring 112 are effectively screwed together by nature of the threaded engagement from the plurality of threads 130 of the first ring 110 and the plurality of threads 132 of the second ring 112. In some embodiments, the sidewall 170 (and exterior surface 171B) defines a radius greater than a radius of the recessed portion 154 of the first ring 110. This enables the recessed portion 154 of the first ring 110 to be received along the interior surface 171A of the sidewall 170 of the second ring 112, and further allows a portion of the sidewall 170 to overlap the first recessed portion 154 and the plurality of threads 130 as the threaded engagement progresses.

Figure 6G:
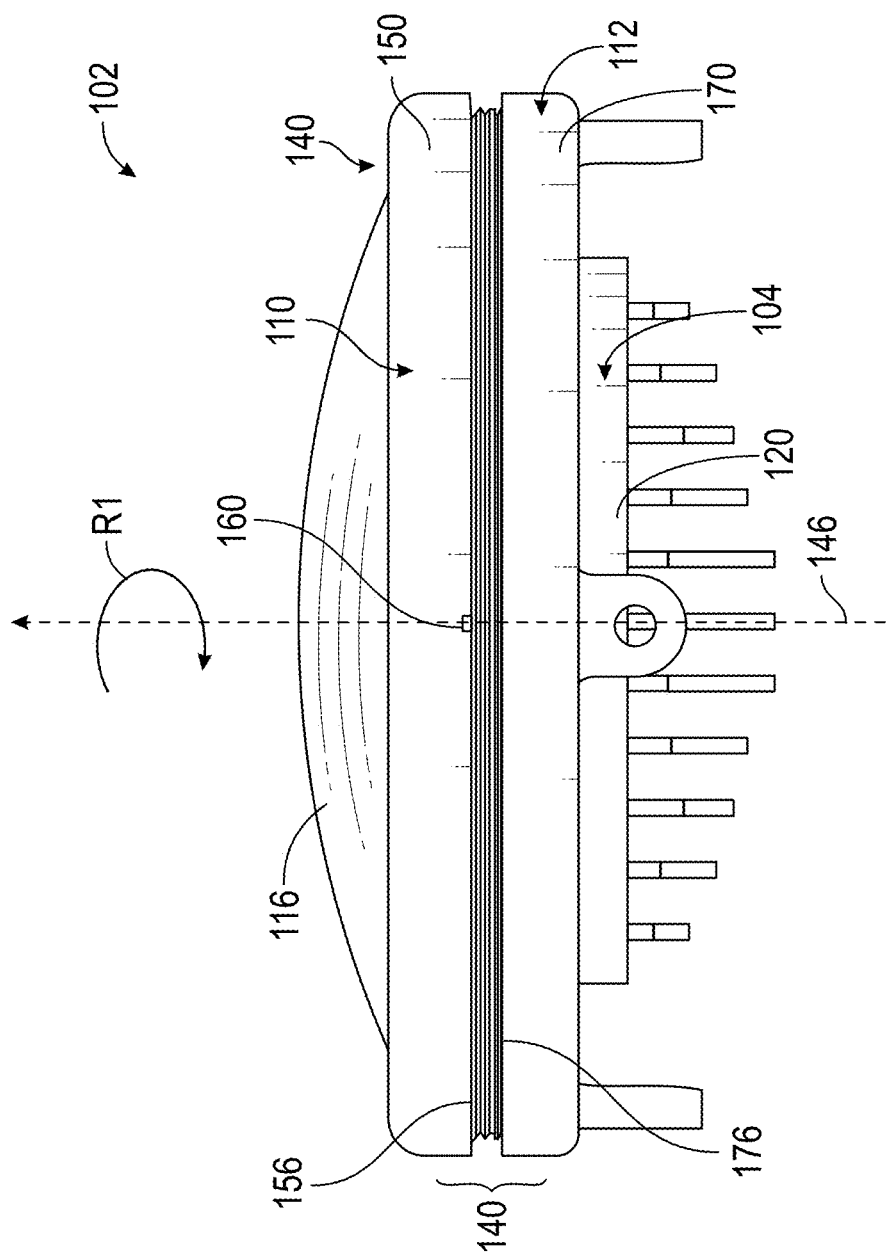
Figure 6H:
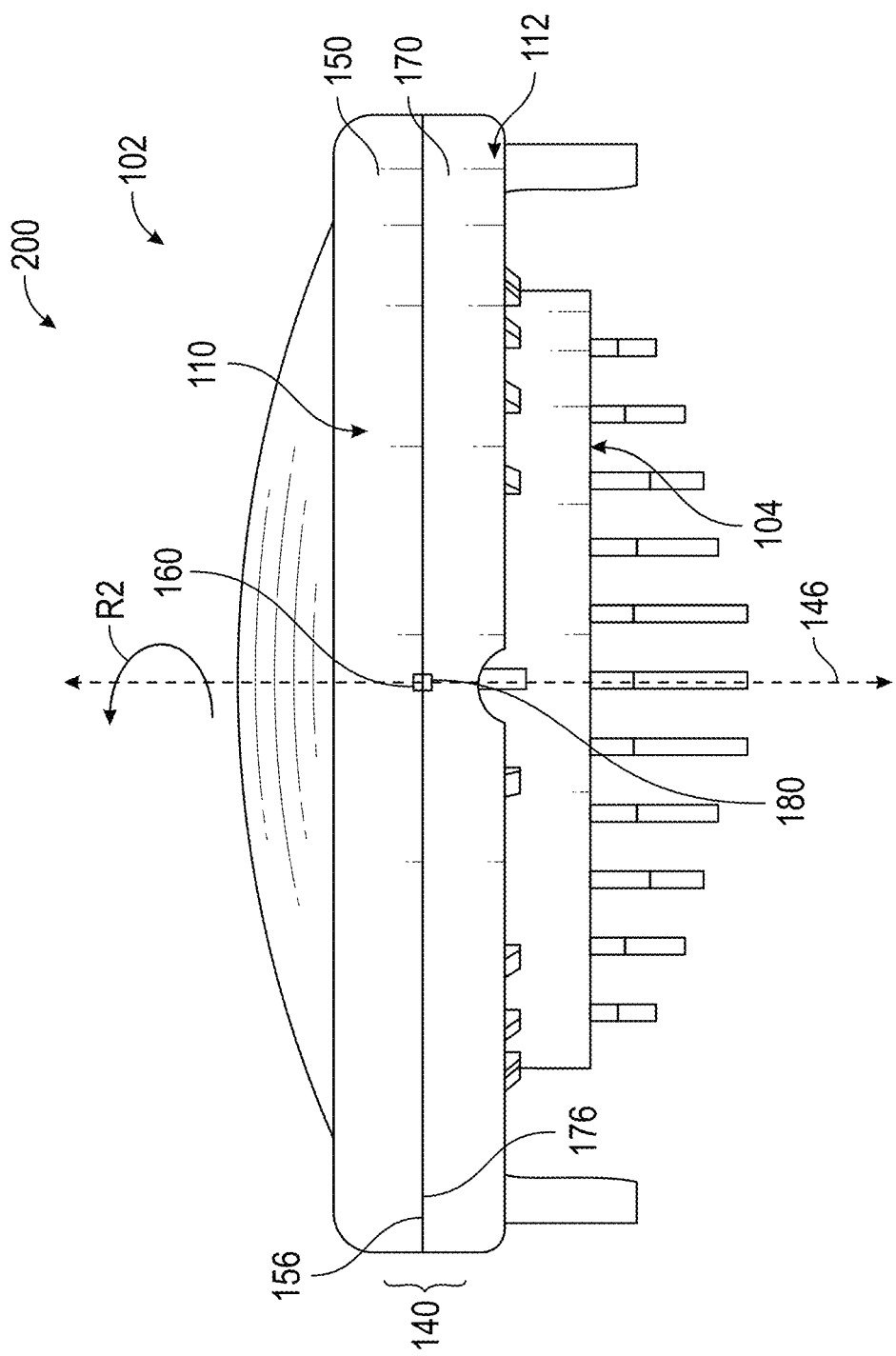

Referring to FIG. 6G, as the first ring 110 and the second ring 112 are rotated relative to one another (in the rotational direction R1) as described, the mating end 156 is brought in closer contact with the mating end 176, and the second ring 112 extends around the housing 120 and structure of the light element 104 and temporarily locks the housing 120 of the light element between the first ring 110 and the second ring 112. As shown in FIGS. 6G-6H, the first ring 110 and second ring 112 are rotated relative to one another as described until the mating end 156 is effectively flush with the mating end 176.

Figure 6I:
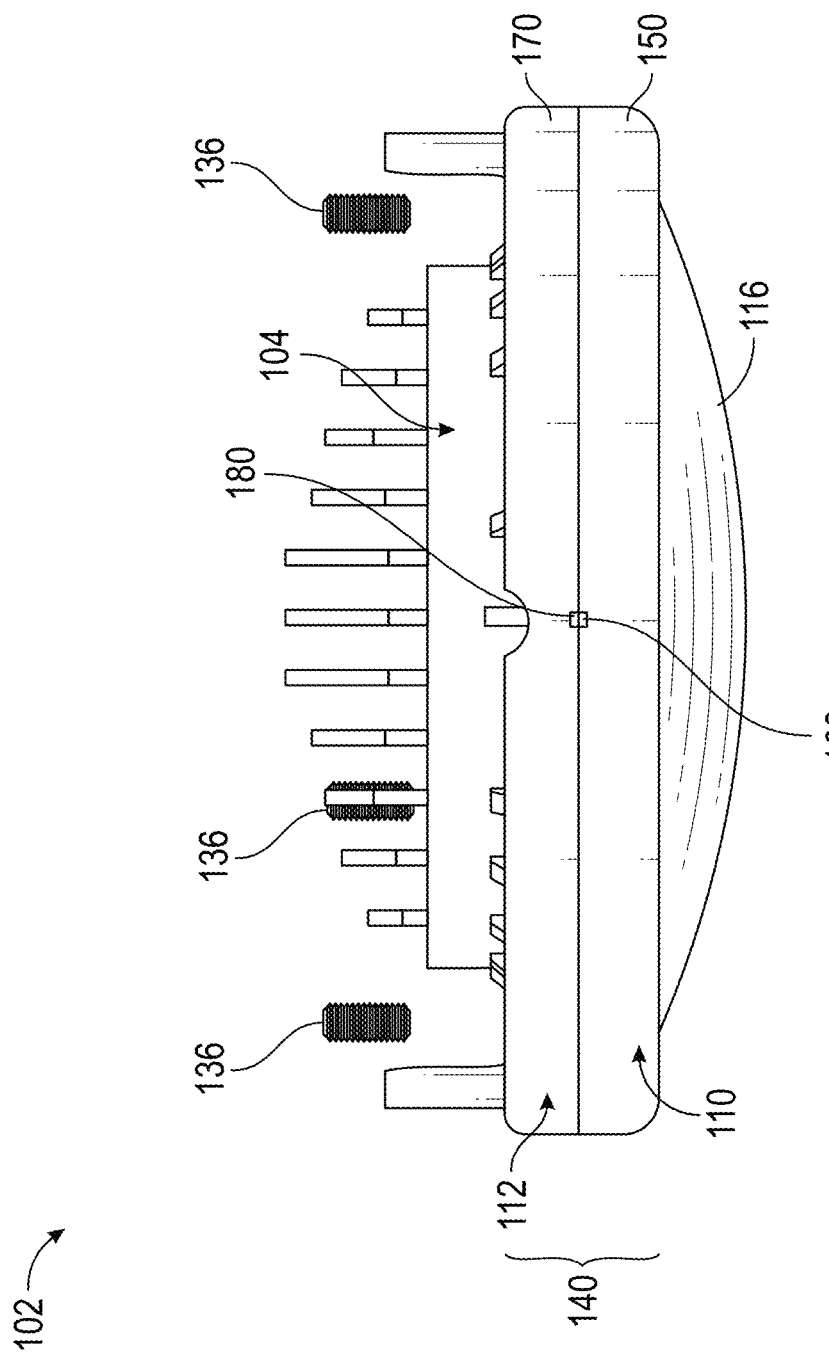
Figure 6J:
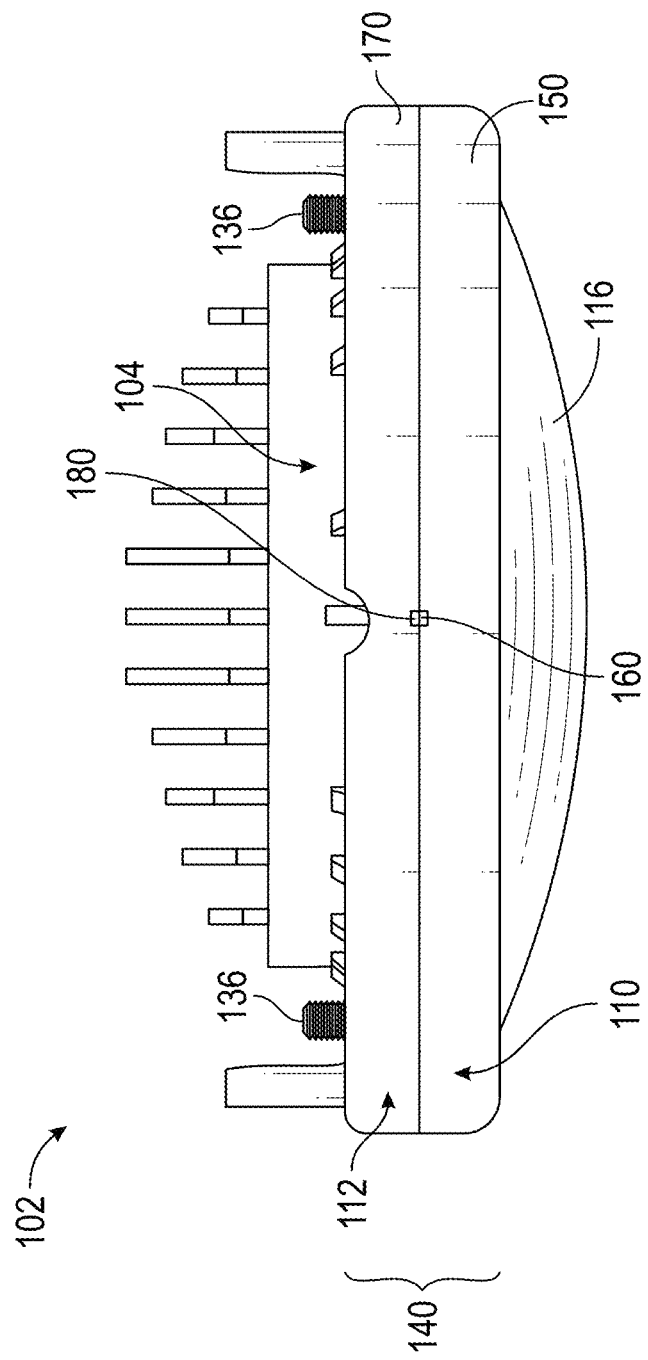

In addition, as indicated, the alignment marker 160 and the alignment marker 180 are again informative as they may be collectively leveraged to identify and assume a final or locked axial configuration 200 of the body 140 such that when the alignment marker 160 and the alignment marker 180 are again in vertical alignment as indicated in FIG. 6H, and the first ring 110 and the second ring 112 are brought together as shown (mating end 156 is effectively flush with the mating end 176), the plurality of indentations 158 and the plurality of openings 178 are also further vertically aligned and in communication with one another. In some embodiments, aligning the alignment marker 160 and the alignment marker 180 as described involves some counter-clockwise rotation in the rotational direction R2 to find the described vertical aliment and final axial configuration 200. Vertical alignment of the plurality of indentations 158 and the plurality of openings 178 (shown in FIG. 7B) accommodates insertion or engagement of the plurality of fasteners 136 as indicated in FIGS. 6I-6K. In some embodiments, the plurality of openings 178 included a threaded portion corresponding to a threaded portion defined along each of the plurality of fasteners 136.

Figure 7A:
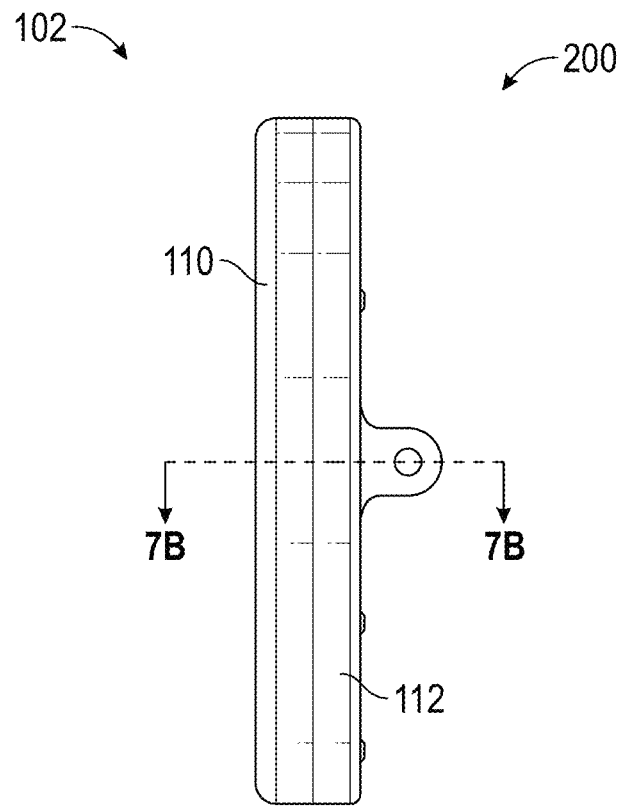
FIG. 7A is a side view of the light holder described herein with the first ring engaged to the second ring according to the process of FIGS. 6A-6K.
Figure 7B:
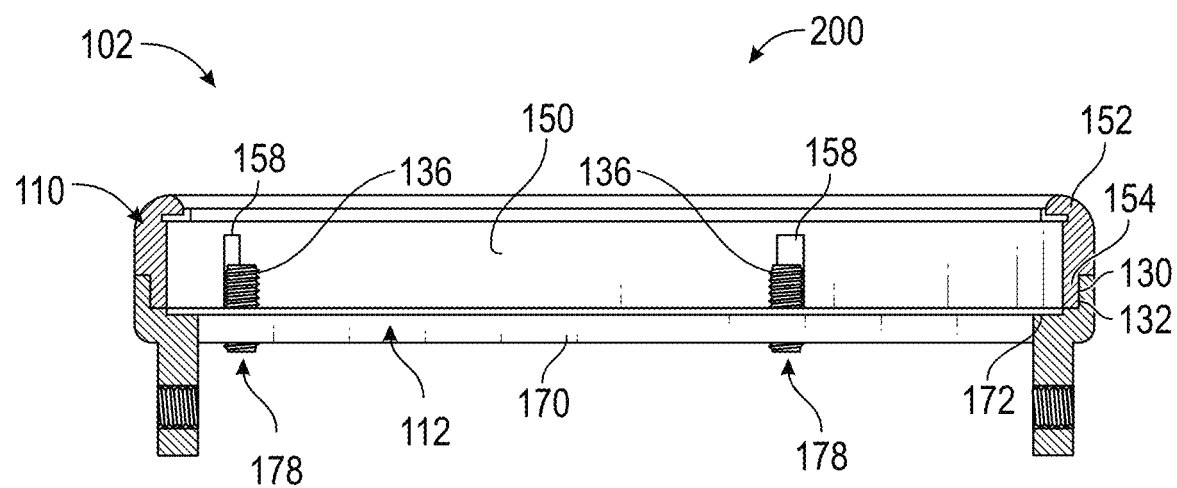
FIG. 7B is a cross section of FIG. 7A taken along line 7B-7B of FIG. 7A.

FIGS. 7A-7B, 8A-8B, 9A-9B, and 10A-10B illustrate further detail regarding the aforementioned process and resulting positions of the various components of the light holder 102 once the locked axial configuration 200 is formed as described. For example, FIGS. 7A-7B illustrate the light holder 102 in the locked axial configuration 200 without the light element 104, with FIG. 7B providing a cross section view of FIG. 7A taken along the line 7B-7B. As shown, aligning the plurality of indentations 158 of the first ring 110 with the plurality of openings 178 of the second ring 112 in the final axial configuration 200 as described herein accommodates engagement of the plurality of fasteners 136 at least partially through predetermined portions of the light holder 102. In addition, the plurality of threads 130 of the first ring 110 is fully engaged with the plurality of threads 132 of the second ring 112.

Figure 8A:
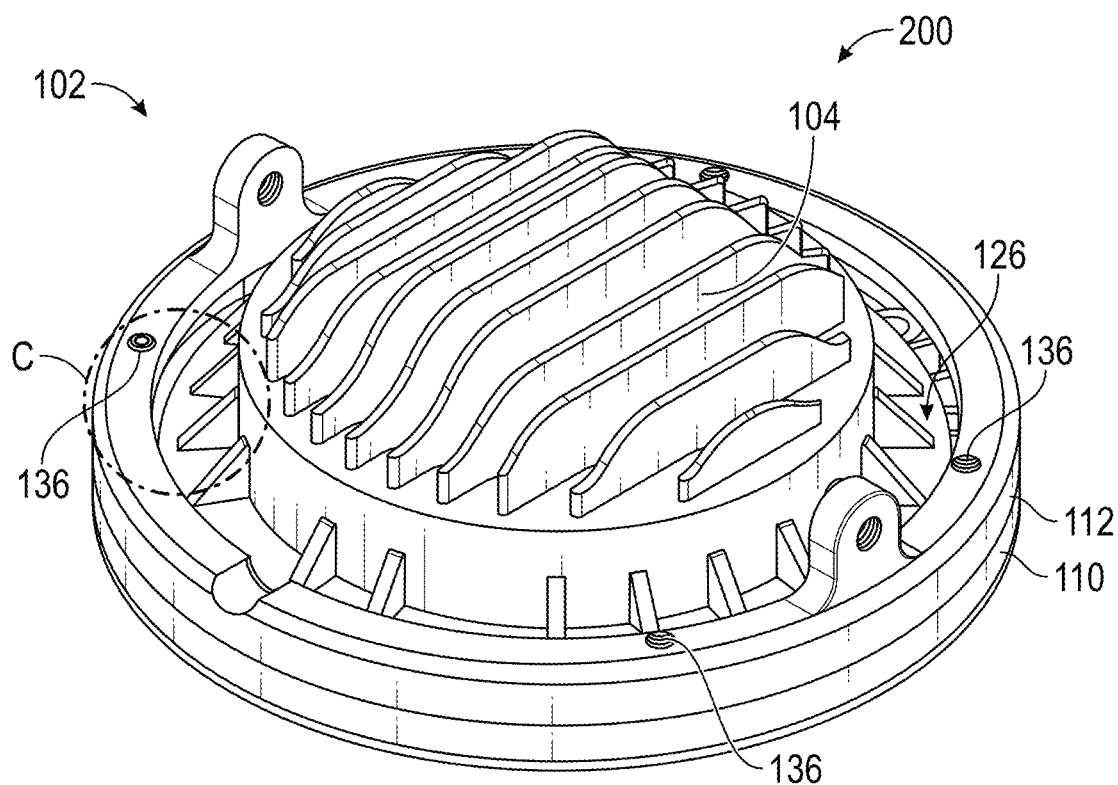
FIG. 8A is a rear view of the light holder described herein.
Figure 8B:
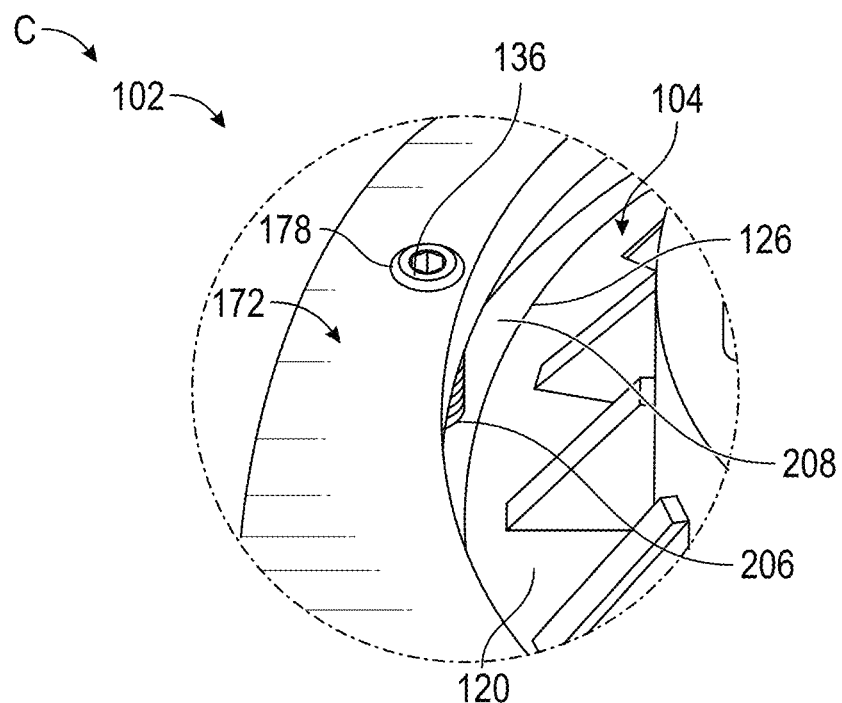
FIG. 8B is an enlarged view of the region C indicated in FIG. 8A.
Figure 9A:
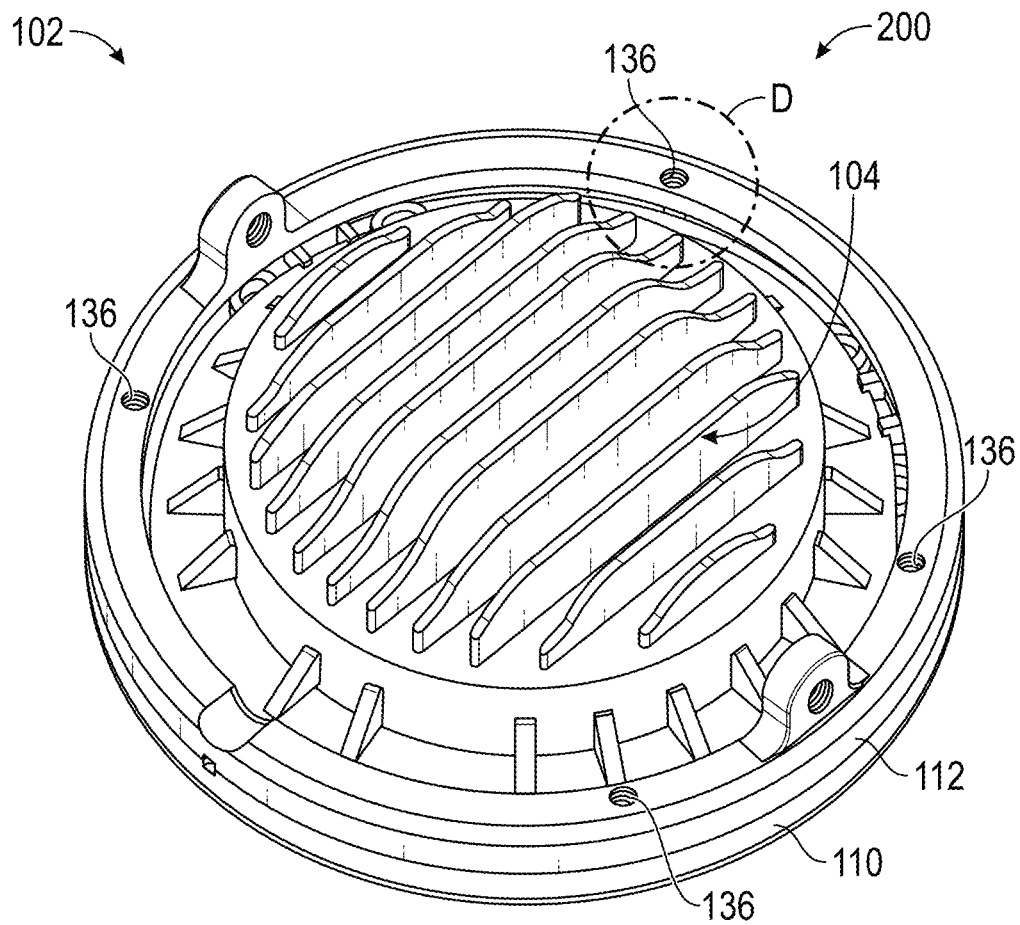
FIG. 9A is another rear view of the light holder described herein.
Figure 9B:
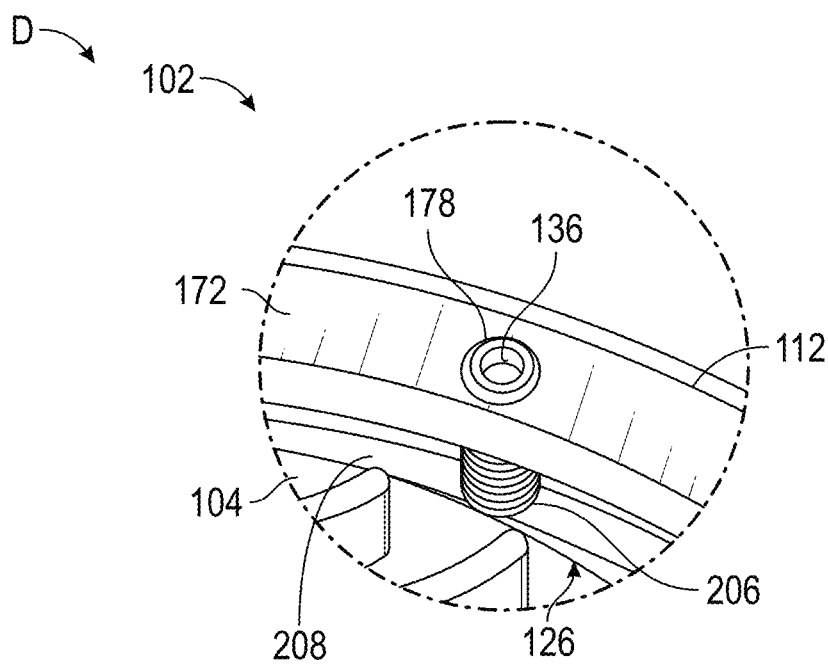
FIG. 9B is an enlarged view of the region D indicated in FIG. 9A

FIGS. 8A-8B show the light holder 102 in the final axial configuration 200 locked about the light element 104. FIG. 8B is an enlarged region C of FIG. 8A, illustrating additional detail regarding the orientation and positioning of each of the plurality of fasteners 136 within the light holder 102 and along the light element 104. As shown, the shelf 172 of the second ring 112 defines the plurality of openings 178 which receive the plurality of fasteners 136. In addition, a tip 206 of each of the plurality of fasteners 136 contacts or rests over a surface 208 defined by the peripheral flange 126 of the light element 104 underneath the shelf 172 to lock the light element 104 in place. The present positioning is similarly illustrated in FIGS. 9A-9B.

Figure 10A:
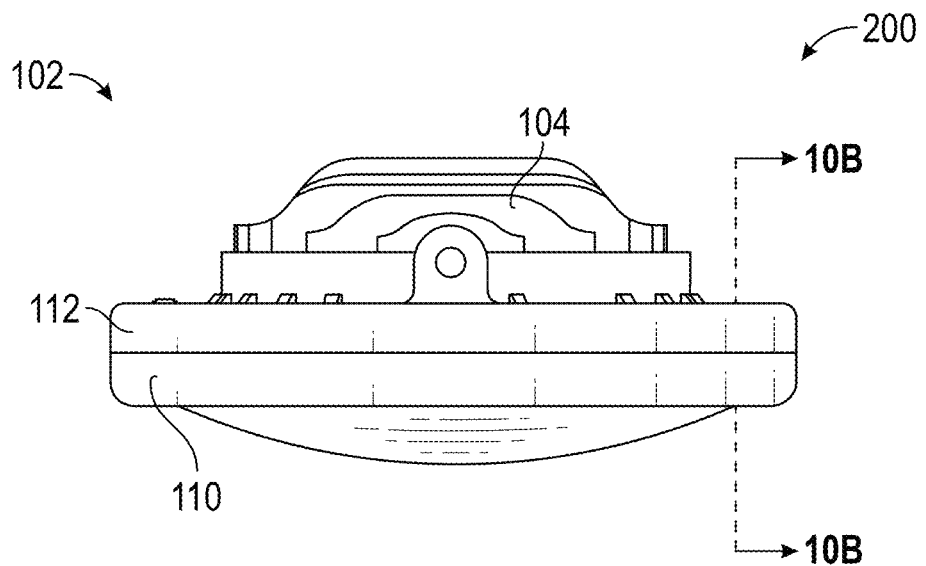
FIG. 10A is a side view of the light holder described herein with the first ring engaged to the second ring according to the process of FIGS. 6A-6K.
Figure 10B:
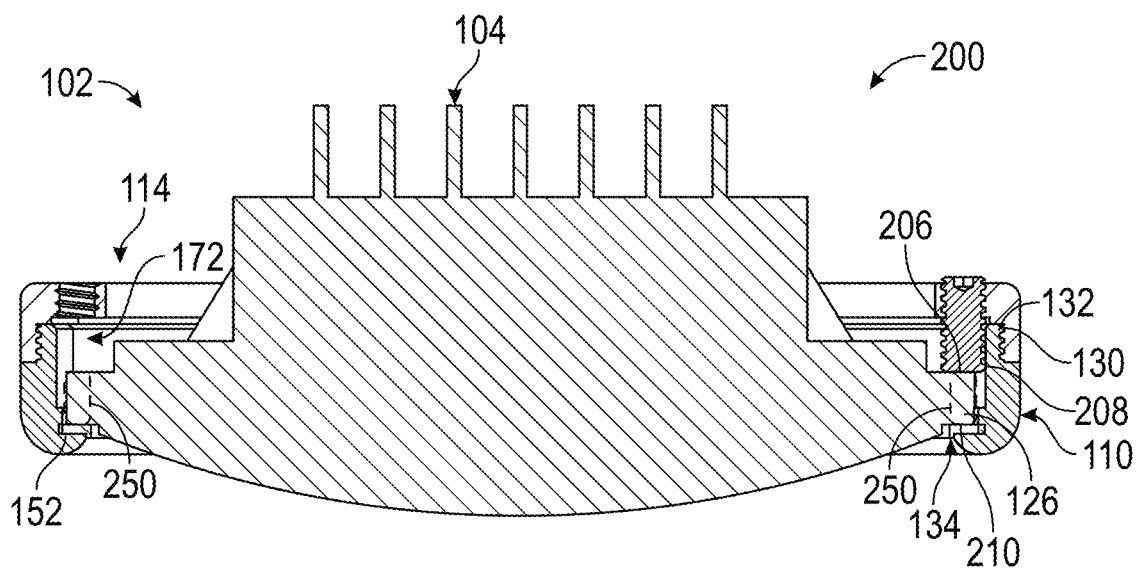
FIG. 10B is a cross section of FIG. 10A taken along the line 10B-10B in FIG. 10A.

FIGS. 10A-10B show even further detail about the advantageous arrangement and positioning of components within and along the light holder 102 relative to the light element 104. For example, FIG. 10B is a cross section of FIG. 10A taken along the line 10B-10B (with some portions of the light assembly 100 removed for clarity), providing enhanced illustration regarding the general arrangement of various components of the light assembly 100 in the final axial configuration 200. FIG. 10B clarifies that the spacer 134 is seated along the ridge 152 such that the spacer 134 is generally positioned between the ridge 152 and a surface 210 of the light element 104 defined along a side of the peripheral flange 126 opposite the surface 208. Further, each of the plurality of fasteners 136 extends through the plurality of openings 178 with each corresponding fastener tip 206 contacting or oriented towards the surface 208 of the peripheral flange 126 of the light element 104. As shown, the first ring 110 is in threaded engagement with the second ring 112 by nature of the engagement between the plurality of threads 130 and the plurality of threads 132. Once threaded together and positioned as shown this manner, each of the plurality of fasteners 136 apply equal pressure to the housing 120 of the light element 104, securing the pieces of the light holder 102 as the assembly 100.

As further shown, an annular cavity 250 is formed generally between the ridge 152 of the first ring 110 and the shelf 172 of the second ring 112 as shown. When the first ring 110 is in threaded engagement with the second ring 112 as described and illustrate, at least a portion of the light element (e.g., peripheral flange 126 of the housing 120) is secured within the annular cavity 250 by nature of the ridge 152 and shelf 172 such that the light element 104 is restricted from movement away from the light holder 102. The channel 114 communicates with the annular cavity 148 collectively defined by the first ring 110 and the second ring 112 and receives the peripheral flange 126 of the light element 104.

Various embodiments, sub-embodiments, and other features are contemplated. For example, the first ring 110 and/or the second ring 112 may be formed using aluminum (e.g., 6061), steel, or other metals or combinations thereof. The spacer 134 may be formed using plastic, rubber, composites, or some other semi-rigid material to provide stabilization and cushioning as described. The plurality of fasteners 136 may be stainless steel jacking set screws, but other embodiments are contemplated. The light element 104 may be a discrete component such as a 7" or 5¾" (these are the two most common lights, but others are contemplated) aftermarket LED light. Yet, as described, the light holder 102 and the spacer 134 can be adapted for different lights including different light dimensions and different light structures. Any number of rubber washers may be also employed with the plurality of fasteners 136 or along the light holder 102.

In addition, the alignment markers 160 and the alignment markers 180 may be formed using ridges or protrusions, indentations, graphical images, and the like and combinations thereof. The plurality of threads 130 and the plurality of threads 132 may take different forms and profiles. For example, the plurality of threads 130 and the plurality of threads 132 may include profiles such as thread and square thread, "v"-shape threads, seller threads, taper threads, and may include any number or variation of thread features such as thread angles, thread depths, diameter, pitch, and the like.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A light assembly for efficient aftermarket installation of a light element, comprising:

a light holder including a body defining a center axis, an exterior side, and an interior side between the center axis and the exterior side, comprising:
- a first ring including a first ring sidewall, a ridge extending annularly from the first ring sidewall along the interior side of the body towards the center axis, a recessed portion in communication with the first ring sidewall extending annularly along the first ring, and a plurality of first ring threads defined circumferentially along the recessed portion and oriented towards the exterior side of the body; and
- a second ring adapted for removable connection with the first ring, the second ring including a second ring sidewall, a shelf extending annularly from the second ring sidewall along the interior side of the body towards the center axis, and a plurality of second ring threads defined circumferentially along the second ring and oriented towards the interior side of the body,
- wherein the second ring is adapted to rotatably engage with the first ring to assume a locked configuration by engaging the plurality of first ring threads with the plurality of second ring threads and rotating the first ring relative to the second ring such that the second ring is removably mounted over the first ring to form an annular cavity between the first ridge and the second ridge that secures a light element.

2. The light assembly of claim 1, wherein the light holder further comprises:
- a plurality of indentations formed along an interior surface of the first ring sidewall; and
- a plurality of openings formed through the shelf of the second ring, the plurality of indentations and the plurality of openings adapted to receive a plurality of securing fasteners at least partially through the body to maintain the first ring in a fixed position relative to the second ring.

3. The light assembly of claim 2, wherein the light holder further comprises:
- a first alignment marker defined along an external surface of the first ring sidewall; and
- a second alignment marker defined along an external surface of the second ring sidewall,
- wherein vertical alignment of the first alignment marker with the second alignment marker further vertically aligns the plurality of indentations of the first ring with the plurality of openings of the second ring.

4. The light assembly of claim 1, wherein the first ring or the second ring is configured for rotation in a first rotational direction until a mating surface of the first ring contacts a mating surface of the second ring.

5. The light assembly of claim 4, wherein the first ring or the second ring is configured for rotation in a second rotational direction to align alignment markers corresponding to each of the first ring and the second ring.

6. The light assembly of claim 1, wherein the second ring sidewall includes a radius greater than a radius of the recessed portion of the first ring such that during engagement of the first ring to the second ring the second ring sidewall at least partially overlaps the recessed portion of the first ring.

7. The light assembly of claim 1, further comprising:
- a spacer positioned along the ridge of the first ring, the spacer preconfigured in dimensions and size to accommodate corresponding dimensions and a size specific to the light element, the spacer providing a cushion and vibration protection between the body and the light element.

8. The light assembly of claim 1, wherein in the locked configuration a fastening member is passed through an opening of the shelf and contacts a peripheral flange of the light element.

9. The light assembly of claim 1, wherein in the locked configuration a peripheral flange of the light element is secured within the annular cavity.

10. The light assembly of claim 1, The light assembly of claim 1, further comprising a plurality of mounting tabs formed along the body for mounting the body of the light holder to a motorcycle frame.

11. A method of making a light assembly for efficient aftermarket installation of a light element, comprising:
- providing a light holder including a body defined collectively by a first ring adapted to removably connect with a second ring about a light element, including:
  - forming the first ring with a first ring sidewall and a recessed portion in communication with the first ring sidewall;
  - forming a plurality of first ring threads along the recessed portion such that the plurality of first ring threads are oriented towards an external side of the body;
  - providing the second ring with a second ring sidewall and a shelf extending towards the interior side of the body; and
  - forming a plurality of second ring threads along the second ring sidewall oriented towards the interior side of the body;
  - wherein the second ring is adapted to rotatably engage with the first ring and assume a configuration by engaging the plurality of first ring threads with the plurality of second ring threads and rotating the first ring relative to the second ring such that the second ring is removably mounted to the first ring to form an annular cavity that receives and secures a peripheral flange of the light element.

12. The method of claim 11, further comprising assuming the configuration, by:
- positioning the first ring over the light element such that a mating surface of the first ring is oriented towards a face portion of the light element,
- resting a ridge of the first ring along the peripheral flange of the light element,
- connecting the first ring with the second ring by engaging the plurality of first ring threads with the plurality of second ring threads and applying a rotation force along a first rotational direction until a first mating surface of the first ring contacts a second mating surface of the second ring, and
- aligning a first ring alignment marker with a second ring alignment marker to vertically align an opening formed through the shelf of the second ring with an indentation formed along an interior surface of the first ring sidewall.

13. The method of claim 12, further comprising:
- providing a reverse rotation force along a second rotational direction until the first ring alignment marker is aligned with the second ring alignment marker.

14. The method of claim 11, further comprising:
- providing a spacer configured for insertion along a ridge of the first ring such that the spacer is sandwiched between the peripheral flange of the light element and the ridge, the spacer providing a cushion and vibration protection between the body and the light element.

15. A light assembly for efficient aftermarket installation of a light element, comprising:
a light holder defining a channel and adapted to assume a configuration that secures a light element in a fixed position relative to a vehicle, including:
a first ring including a first ring sidewall, a recessed portion defined along a proximal portion of the first ring sidewall, a ridge extending towards the channel and defined along a distal portion of the first ring sidewall, and a plurality of first ring threads defined along the recessed portion oriented away from the channel; and
a second ring including a second ring sidewall, a shelf extending towards the channel, and a plurality of second ring threads formed along the second ring sidewall oriented towards the channel,
wherein the second ring is adapted to rotatably engage with the first ring by engaging the plurality of first ring threads with the plurality of second ring threads to assume the configuration and form an annular cavity in communication with the channel and defined between the ridge and the shelf that receives and secures a peripheral flange of the light element.

16. The light assembly of claim 15, further comprising:
an opening formed through the shelf of the second ring; and
an indentation formed along an interior surface of the first ring sidewall,
wherein the light holder is configured to accommodate alignment of the indentation with the opening to receive a fastener.

17. The light assembly of claim 16, further comprising:
a first alignment marker defined along an exterior surface of the first ring sidewall; and
a second alignment marker defined along an exterior surface of the second ring sidewall,
wherein vertical alignment of the first alignment marker with the second alignment marker further vertically aligns the opening with the indentation.

18. The light assembly of claim 15, further comprising:
a spacer configured for insertion along the ridge of the first ring such that the spacer is sandwiched between the peripheral flange of the light element and the ridge, the spacer providing a cushion and vibration protection between the light holder and the light element.

19. The light assembly of claim 15, wherein in the configuration the peripheral flange of the light element is secured within the annular cavity.

20. The light assembly of claim 15, wherein in the configuration the first ring and the second ring are screwed together about a portion of the light element such that a mating surface of the first ring abuts a mating surface of the second ring.

* * * * *